US011037596B2

(12) United States Patent (10) Patent No.: US 11,037,596 B2
Miura (45) Date of Patent: Jun. 15, 2021

(54) MOTOR DRIVER DEVICE AND SEMICONDUCTOR DEVICE

(71) Applicant: Rohm Co., Ltd., Kyoto (JP)

(72) Inventor: Shinichi Miura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 16/578,566

(22) Filed: Sep. 23, 2019

(65) Prior Publication Data
US 2020/0105298 A1 Apr. 2, 2020

(30) Foreign Application Priority Data

Sep. 27, 2018 (JP) .............................. JP2018-181193

(51) Int. Cl.
*G11B 19/20* (2006.01)
*H02P 7/29* (2016.01)
*H02P 7/025* (2016.01)
*H02P 5/68* (2006.01)

(52) U.S. Cl.
CPC ............ *G11B 19/2009* (2013.01); *H02P 5/68* (2013.01); *H02P 7/025* (2016.02); *H02P 7/29* (2013.01)

(58) Field of Classification Search
CPC ............... H02P 7/29; H02P 7/025; H02P 5/68
USPC .................. 318/400.29, 400.26, 400.01, 700
See application file for complete search history.

(56) References Cited

U.S. PATENT DOCUMENTS

| | | | | |
|---|---|---|---|---|
| 7,759,889 B2* | 7/2010 | Hirata | ..................... | H02P 6/182 318/400.29 |
| 8,159,167 B2* | 4/2012 | Haas | ...................... | H02P 6/157 318/400.29 |
| 8,581,534 B2* | 11/2013 | Tsai | .......................... | H02P 7/29 318/400.26 |
| 8,810,942 B2* | 8/2014 | Otaguro | .................... | H02P 6/28 360/51 |

* cited by examiner

*Primary Examiner* — David Luo
(74) *Attorney, Agent, or Firm* — Fish & Richardson P.C.

(57) ABSTRACT

A motor driver device for driving a motor with a full-bridge circuit includes: a switching driver configured to perform switching driving in which a switching voltage is supplied from the full-bridge circuit to the motor; a linear driver configured to perform linear driving in which a continuous linear voltage is supplied from the full-bridge circuit to the motor; and a control circuit configured to set a driving mode of the motor to a switching driving mode in which the switching driving is performed or a linear driving mode in which the linear driving is performed.

10 Claims, 19 Drawing Sheets

Current path A (First ON/OFF state)

Current path B (Second ON/OFF state)

Current path C (Third ON/OFF state)

Current path Z (Fourth ON/OFF state)

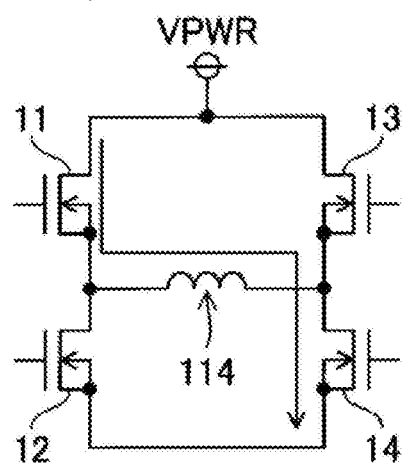

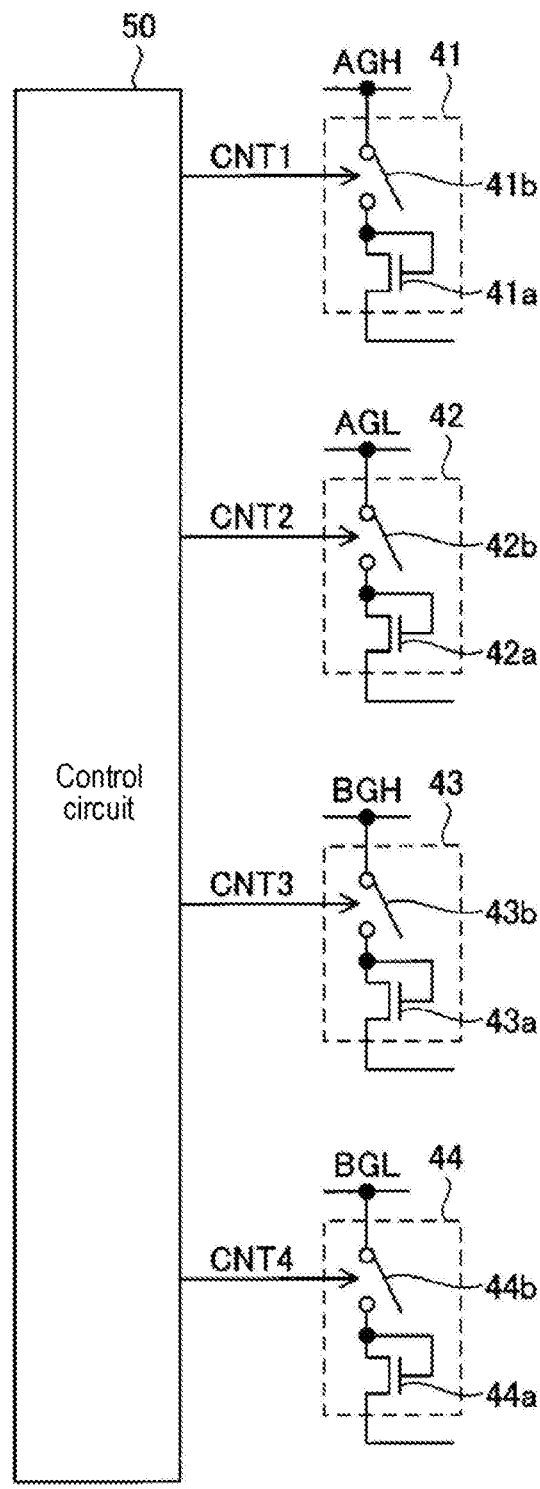

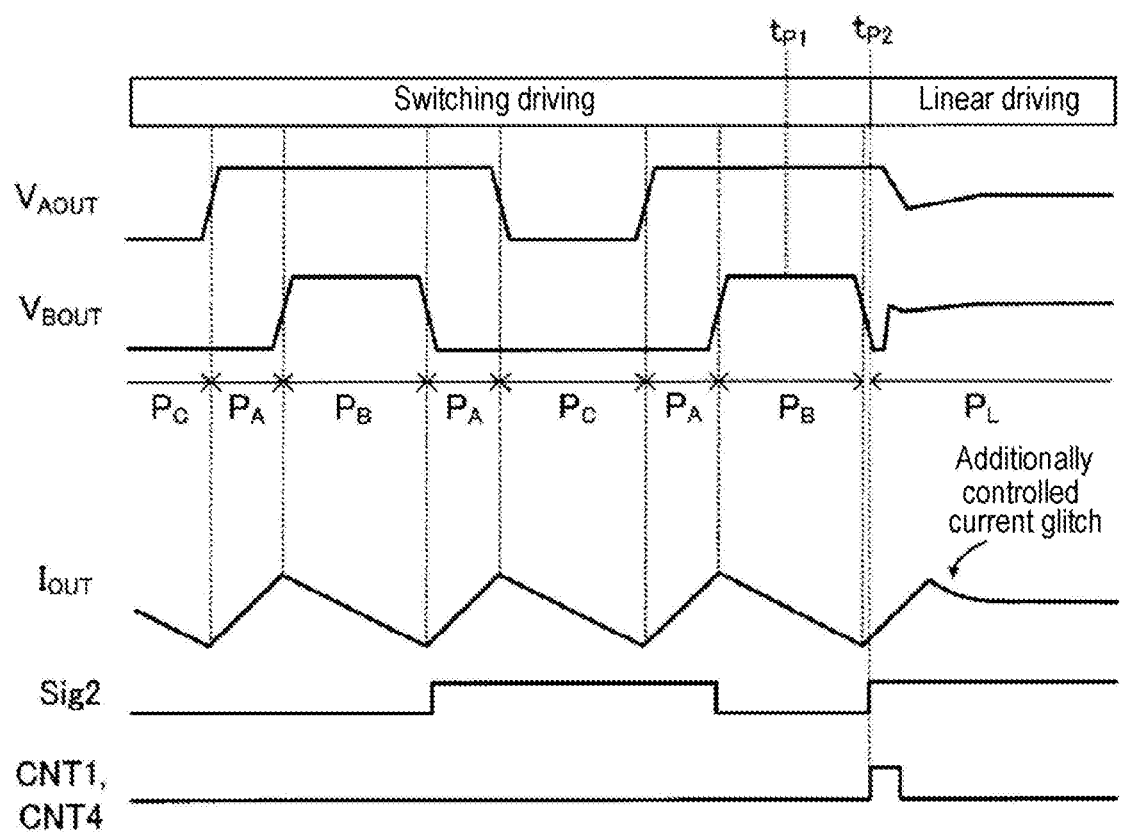

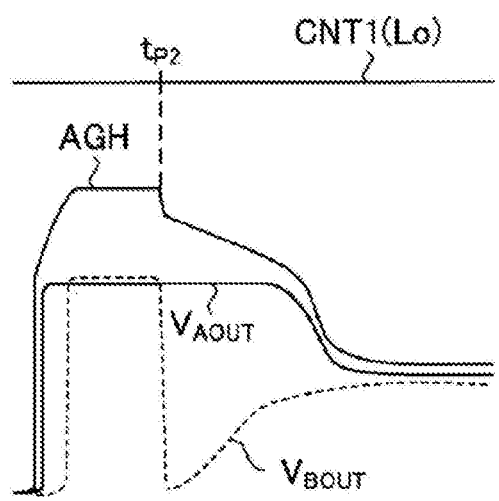
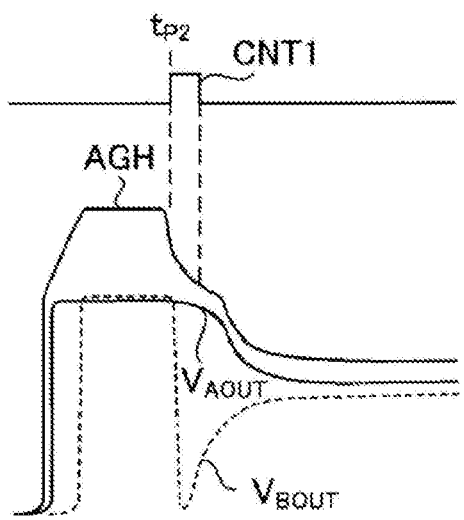
FIG. 19A    FIG. 19B
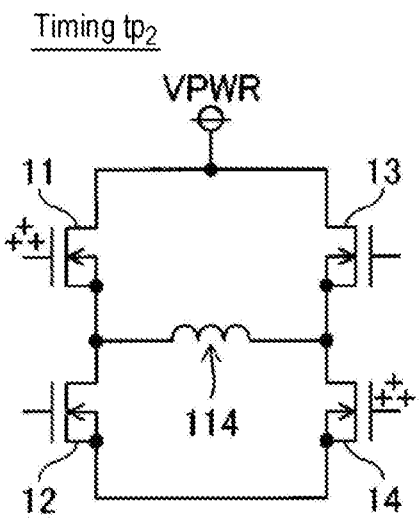
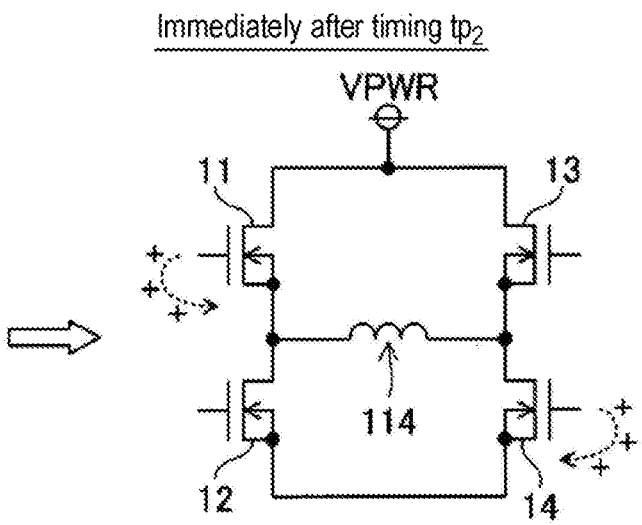
FIG. 20

MOTOR DRIVER DEVICE AND SEMICONDUCTOR DEVICE

CROSS-REFERENCE TO RELATED APPLICATION

This application is based upon and claims the benefit of priority from Japanese Patent Application No. 2018-181193, filed on Sep. 27, 2018, the entire contents of which are incorporated herein by reference.

TECHNICAL FIELD

The present disclosure relates to a motor driver device and a semiconductor device.

BACKGROUND

There are a switching driving method and a linear driving method as methods for driving a motor with a full-bridge circuit. In the switching driving method, a switching voltage is supplied to the motor by switching respective power transistors constituting the full-bridge circuit using PWM modulation or the like. The switching driving method enables high-efficiency driving of the motor. On the other hand, in the linear driving method, a continuous linear voltage is supplied to the motor by using a linear region (active region) of the power transistors. The linear driving method is inferior to the switching driving method in efficiency, but has a merit that the motor can be controlled with high accuracy.

In a related art, there has been proposed a technique in which a circuit for switching driving and a circuit for linear driving are prepared as circuits for driving a voice coil motor of a magnetic disk device so as to both increase the efficiency and achieve high precision motor control by switching between them as necessary.

In a motor driver device configured to switch the driving method of the motor between the switching driving method and the linear driving method, i.e., in a motor driver device configured to switch a driving mode of the motor between a switching driving mode and a linear driving mode, when high accuracy is required for motor control, the driving mode of the motor can be switched from the switching driving mode to the linear driving mode.

However, since the control method of the power transistors is different between the switching driving mode and the linear driving mode, if the switching driving mode is switched to the linear driving mode without any research thereon, a glitch may occur in a motor current (details of the occurrence of glitch will be described below). For example, in the case where a voice coil motor of a magnetic disk device is a driving target, when a glitch occurs in the motor current at the transition from a seek operation to a tracking operation, there is a risk that a magnetic head, whose position is controlled by the voice coil motor, may jump in an unexpected direction, thereby deteriorating the data read/write performance.

SUMMARY

Some embodiments of the present disclosure provide a motor driver device and a semiconductor device which contribute to suppression of a glitch of motor current that may occur with switching of a motor driving mode.

According to an embodiment of the present disclosure, a motor driver device for driving a motor with a full-bridge circuit, the full-bridge circuit including a first half-bridge circuit including a first high-side transistor and a first low-side transistor directly connected to each other and a second half-bridge circuit including a second high-side transistor and a second low-side transistor directly connected to each other, the motor driver device includes: a switching driver configured to perform switching driving in which a switching voltage is supplied from the full-bridge circuit to the motor; a linear driver configured to perform linear driving in which a continuous linear voltage is supplied from the full-bridge circuit to the motor; and a control circuit configured to set a driving mode of the motor to a switching driving mode in which the switching driving is performed or a linear driving mode in which the linear driving is performed, wherein in a current situation where a motor current flows from the first half-bridge circuit to the second half-bridge circuit through the motor, a current path through which the motor current flows by the switching driving is switched between a plurality of paths, wherein the plurality of paths include: a first path including a path from the first high-side transistor to the second low-side transistor via the motor; a second path including a path from the first high-side transistor to the second high-side transistor via the motor; and a third path including a path from the first low-side transistor to the second low-side transistor via the motor, wherein the motor driver device further includes a detection circuit configured to detect a transition of the current path from the second path to the first path, and a discharging circuit configured to individually discharge gate charges of respective transistors constituting the full-bridge circuit, and wherein the control circuit is configured to perform the switching, in response to a detection of the transition by the detection circuit, when switching the driving mode of the motor from the switching driving mode to the linear driving mode in the current situation, in which a gate charge of the first high-side transistor and a gate charge of the second low-side transistor supplied to a gate of the first high-side transistor and a gate of the second low-side transistor by the switching driver are discharged using the discharging circuit so that the current path is one path.

Specifically, for example, in the motor driver device, each of the first half-bridge circuit and the second half-bridge circuit is disposed between a predetermined power supply voltage part and a predetermined reference potential part, wherein a connection node between the first high-side transistor and the first low-side transistor is connected to a first output terminal, a connection node between the second high-side transistor and the second low-side transistor is connected to a second output terminal, and the motor is connected between the first output terminal and the second output terminal, and wherein the discharging circuit includes: a first high-side discharging circuit inserted between the gate of the first high-side transistor and the first output terminal; a first low-side discharging circuit inserted between a gate of the first low-side transistor and the reference potential part; a second high-side discharging circuit inserted between a gate of the second high-side transistor and the second output terminal; and a second low-side discharging circuit inserted between the gate of the second low-side transistor and the reference potential part.

More specifically, for example, in the motor driver device, when switching the driving mode of the motor from the switching driving mode to the linear driving mode in the current situation, the control circuit is configured to discharge the gate charge of the first high-side transistor and the gate charge of the second low-side transistor, in response to the detection of the transition by the detection circuit, through the first high-side discharging circuit and the second low-side discharging circuit.

Further specifically, for example, in the motor driver device, each of the first high-side discharging circuit, the first low-side discharging circuit, the second high-side discharging circuit, and the second low-side discharging circuit includes a series circuit of a switch and a rectifying element, and wherein when switching the driving mode of the motor from the switching driving mode to the linear driving mode in the current situation, the control circuit is configured to turn on the switch of each of the first high-side discharging circuit and the second low-side discharging circuit only for a predetermined time, in response to the detection of the transition by the detection circuit, so that the gate charge of the first high-side transistor and the gate charge of the second low-side transistor are discharged through the corresponding rectifying element.

More specifically, for example, in the motor driver device, in each of the first high-side discharging circuit, the first low-side discharging circuit, the second high-side discharging circuit, and the second low-side discharging circuit, the rectifying element is configured as a diode-connected discharging transistor.

Furthermore, for example, in the motor driver device, the control circuit is configured to receive input of predetermined information and set the driving mode of the motor to the switching driving mode when the predetermined information indicates first information or set the driving mode of the motor to the linear driving mode when the predetermined information indicates second information, and wherein when there is a change from the first information to the second information in the predetermined information when the switching driving is performed, the control circuit is configured to wait for switching to the linear driving mode until the transition is detected by the detection circuit, and switch the driving mode of the motor from the switching driving mode to the linear driving mode in response to the detection of the transition.

In addition, for example, the motor driver device further includes: a feedback control signal generation circuit configured to generate a feedback control signal based on a current command signal that specifies a magnitude and a direction of the motor current and a detection signal of the motor current, wherein the switching driver is configured to supply the switching voltage based on the feedback control signal to the motor in the switching driving, wherein the linear driver is configured to supply the continuous linear voltage based on the feedback control signal to the motor in the linear driving, and wherein the control circuit is configured to receive the current command signal as the predetermined information.

Further, for example, in the motor driver device, the control circuit is configured to: set the driving mode of the motor to the switching driving mode when the magnitude of the motor current specified by the current command signal is larger than a predetermined value; and set the driving mode of the motor to the linear driving mode when the magnitude of the motor current specified by the current command signal is smaller than the predetermined value.

Furthermore, for example, in the motor driver device, the detection circuit is configured to detect whether or not the transition of the current path from the second path to the first path has occurred based on a voltage at a connection node between the second high-side transistor and the second low-side transistor in a process of the transition of the current path from the second path to the first path.

In addition, for example, in the motor driver device, a voice coil motor configured to move a magnetic head of a magnetic disk device in a radial direction of a magnetic disk is driven as the motor.

According to an embodiment of the present disclosure, a semiconductor device forms the motor driver device that is formed using an integrated circuit.

BRIEF DESCRIPTION OF DRAWINGS

FIG. 6 is a diagram illustrating a path through which a motor current flows in a linear driving mode.

FIG. 17 is a diagram illustrating a state in which each switch of a discharging circuit is controlled to be turned on and off by a control circuit.

FIG. 18 is a waveform diagram of voltages and currents around the timing when switching from the switching driving mode to the linear driving mode (when the first and second glitch suppression techniques are employed).

FIGS. 19A and 19B are waveform diagrams of voltages and currents around the timing when switching from the switching driving mode to the linear driving mode, in which FIG. 19A is a waveform diagram when only the first glitch suppression technique is employed, and FIG. 19B is a waveform diagram when the first and second glitch suppression techniques are employed.

FIG. 20 is a diagram illustrating a state in which gate charges of power transistors are discharged when switching from the switching driving mode to the linear driving mode.

DETAILED DESCRIPTION

Figure 1:
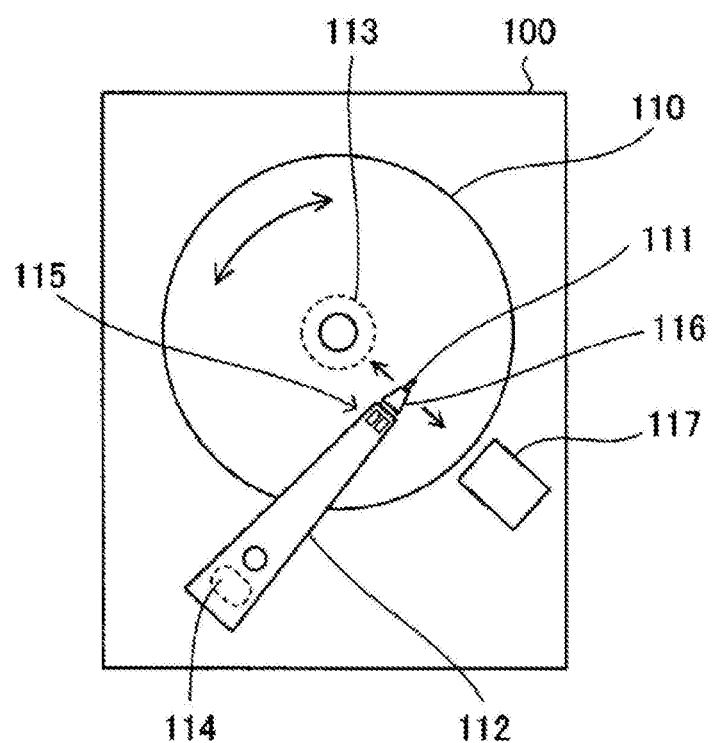
FIG. 1 is a schematic configuration diagram of a mechanism of a hard disk device according to an embodiment of the present disclosure.

Examples of embodiments of the present disclosure will be now described in detail with reference to the drawings. In each of the drawings to be referred to, like parts are denoted by like reference numerals and a repeated description thereof will be omitted in principle. Further, in the present disclosure, for the simplification of description, names of information, signals, physical quantities, members, or the like corresponding to reference symbols or numerals may be omitted or abbreviated by specifying the reference symbols or numerals referring to the information, signals, physical quantities, members, or the like. For example, a power transistor referred to by "11" as described below may be expressed as the power transistor 11 or may be abbreviated as a transistor 11, but they all indicate the same one.

First, some terms used in the description of the present embodiment will be described.

A ground and a ground potential may refer to a conductive part having a reference potential of zero volt (0 V) or the reference potential itself. In each embodiment, a voltage indicated without a specific reference may indicate a potential viewed from the ground. A line may be synonymous with a wiring. A level may refer to a potential level. For any signal or voltage, a high level has a higher potential than a low level.

For any signal or voltage whose level is periodically switched between a low level and a high level, the ratio of length of section where the level of the signal or voltage becomes a high level to the length of section of one cycle of the signal or voltage will be referred to as a duty.

For any transistor configured as a FET (field effect transistor), an ON state refers to a conductive state between a drain and a source of the transistor, and an OFF state refers to a non-conductive state (blocking state) between the drain and the source of the transistor. Any switch includes one or more FETs. When a switch is in an ON state, both terminals of the switch are conductive, while when a switch is in an OFF state, both terminals of the switch are non-conductive. Hereinafter, for any transistor or switch, the ON state and the OFF state may be simply expressed as ON and OFF.

FIG. 1 is a schematic configuration diagram of a mechanism of a hard disk device (hereinafter, referred to as an HDD device) 100 as a magnetic disk device according to an embodiment of the present disclosure.

The HDD device 100 includes a magnetic disk 110 which is a recording medium, a magnetic head 111 (hereinafter, also referred to as a head 111) which writes and reads information to and from the magnetic disk 110, an arm 112 which movably and freely supports the magnetic head 111 with respect to a radial direction of the magnetic disk 110, a spindle motor 113 (hereinafter, also referred to as a SPM 113) which supports and rotates the magnetic disk 110, and a voice coil motor 114 (hereinafter, also referred to as a VCM 114) which moves and positions the magnetic head 111 with respect to the radial direction of the magnetic disk 110 by rotatably driving and positioning the arm 112.

The HDD device 100 further includes a pair of piezoelectric elements 115, a load beam 116, and a ramp part 117 which holds the magnetic head 111 at a predetermined retraction position separated from the magnetic disk 110. The load beam 116 is attached to a leading end of the arm 112, and the magnetic head 111 is attached to a leading end of the load beam 116. The pair of piezoelectric elements 115 are disposed near the attachment portion of the load beam 116 at the leading end of the arm 112. By applying voltages having opposite phases to the pair of piezoelectric elements 115, the pair of piezoelectric elements 115 can expand and contract in the opposite phases to displace the magnetic head 111 at the leading end of the load beam 116 in the radial direction of the magnetic disk 110.

As described above, the HDD device 100 employs a so-called two-stage actuator system. The VCM 114 functions as a coarse actuator which roughly positions (positions with a relatively coarse resolution) the magnetic head 111 on the magnetic disk 110 by driving the arm 112, and the pair of piezoelectric elements 115 function as a fine actuator which precisely positions (positions with a finer resolution than the VCM 114) the magnetic head 111 on the magnetic disk 110 by adjusting the position of the magnetic head 111 with respect to the position of the arm 112. Hereinafter, the actuator including the pair of piezoelectric elements 115 will be referred to as an MA 115 using the abbreviation "MA" of microactuator. The fine actuator may also be formed as a plurality of stages of actuators by installing a plurality of pairs of piezoelectric elements 115.

The magnetic disk 110, the magnetic head 111, the arm 112 to which the MA 115 and the load beam 116 are attached, the SPM 113, the VCM 114, and the ramp part 117 are stored in a housing of the HDD device 100. Furthermore, regarding the movement and displacement of the magnetic head 111 by the VCM 114 or the MA 115, the movement and displacement of the magnetic disk 110 in the radial direction may indicate the movement and displacement in a direction connecting the outer periphery and the center of the magnetic disk 110 having a disk shape. However, the movement and displacement of the magnetic head 111 by the VCM 114 or the MA 115 may include components of movement and displacement in another direction (for example, a tangential direction of the outer periphery of the magnetic disk 110), in addition to the movement and displacement of the magnetic disk 110 in the radial direction.

Figure 2:
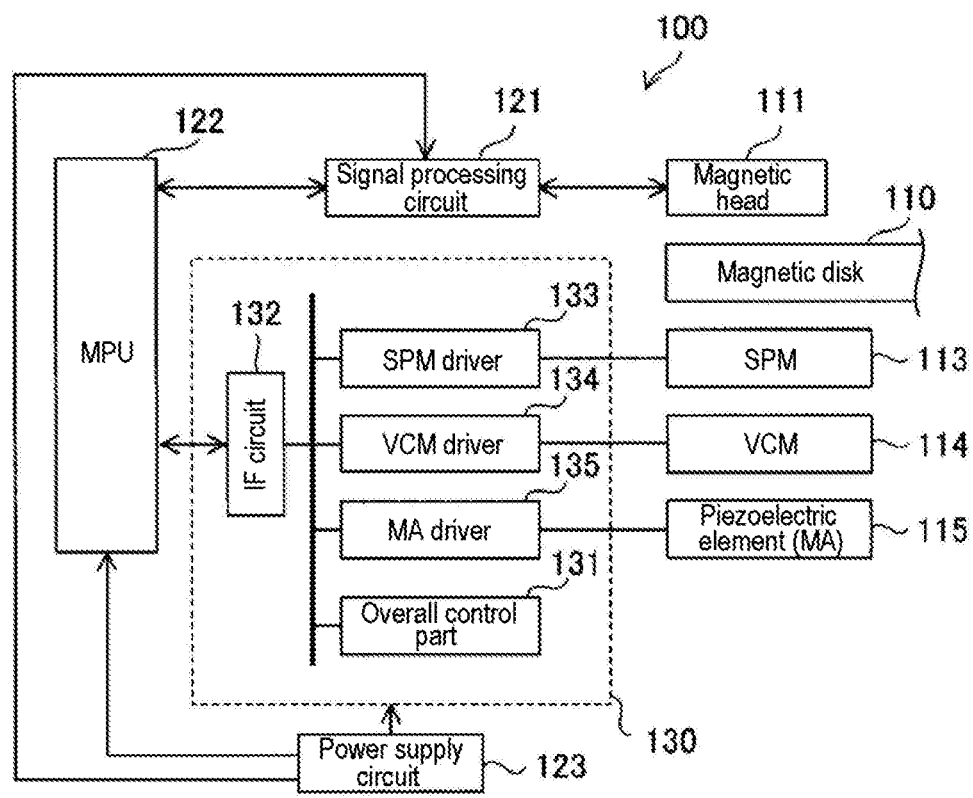
FIG. 2 is an electrical schematic block diagram of the hard disk device according to an embodiment of the present disclosure.

FIG. 2 is an electrical schematic block diagram of the HDD device 100. A driver IC 130, a signal processing circuit 121, an MPU (micro-processing unit) 122, and a power supply circuit 123 are installed as electrical components in the HDD device 100. The power supply circuit 123 supplies a power supply voltage for driving the driver IC 130, the signal processing circuit 121, and the MPU 122, to the driver IC 130, the signal processing circuit 121, and the MPU 122. The MPU 122 is connected to each of the signal processing circuit 121 and the driver IC 130 in a form capable of two-way communication.

When writing information (data) into the magnetic disk 110, the signal processing circuit 121 outputs a recording signal for writing the information to the magnetic head 111, and when reading information (data) from the magnetic disk 110, it performs necessary signal processing on a signal read from the magnetic disk 110 and sends the resulting signal to the MPU 122. The MPU 122 controls writing and reading operations of information by the magnetic head 111 through the control of the signal processing circuit 121.

Figure 3:
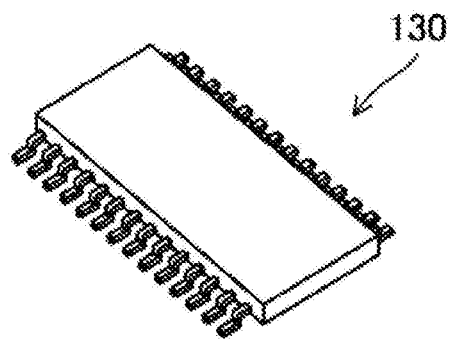
FIG. 3 is an external perspective view of a driver IC mounted on the hard disk device according to an embodiment of the present disclosure.

The driver IC 130 is an electronic component (driver device) formed by packaging a semiconductor integrated circuit as illustrated in FIG. 3 in a housing (package) made of resin. The number of pins (number of external terminals) of the driver IC 130 illustrated in FIG. 3 is merely an example. An SPM driver 133 for driving and controlling the SPM 113, a VCM driver 134 for driving and controlling the VCM 114, and an MA driver 135 for driving and controlling the MA 115 are installed in the driver IC 130, and further, an interface circuit (IF circuit) 132 for enabling two-way communication between the MPU 122 and the driver IC 130, an overall control part 131 for controlling operations of the drivers 133 to 135 based on control data received from the MPU 122 via the IF circuit 132, and the like are installed therein.

The MPU 122 controls rotation of the magnetic disk 110 via the driving control of the SPM 113 by controlling the SPM driver 133 of the driver IC 130, and performs movement control and positioning of the magnetic head 111 via the driving control of the VCM 114 and the MA 115 by controlling the VCM driver 134 and the MA driver 135 of the driver IC 130. Position information indicating each position on the magnetic disk 110 is recorded at each position of the magnetic disk 110. When the magnetic head 111 is positioned on the magnetic disk 110, the position information is read by the magnetic head 111 and transmitted to the MPU 122 via the signal processing circuit 121. The MPU 122 can control the VCM driver 134 and the MA driver 135 based on the position information, and via this control, the VCM driver 134 supplies a necessary driving current to the VCM 114, performing first stage positioning of the magnetic head 111, and the MA driver 135 supplies a necessary voltage to the MA 115, performing second stage positioning of the magnetic head 111. Furthermore, the positioning of the magnetic head 111 on the magnetic disk 110 may mean that the magnetic head 111 is positioned above the magnetic disk 110 with a fine space therebetween.

In a state in which the magnetic head 111 is positioned outside the outer periphery of the magnetic disk 110 and the position information is not read by the magnetic head 111, the MPU 122 can control the VCM driver 134 and the MA driver 135 without depending on the position information. For example, when moving the magnetic head 111 from the retraction position in the ramp part 117 onto the magnetic disk 110, the MPU 122 may output a signal instructing supply of a predetermined driving current suitable for the movement to the VCM 114 to the driver IC 130. Thus, the VCM driver 134 supplies the predetermined driving current based on the signal to the VCM 114. In the state in which the position information is not read by the magnetic head 111, since precise position control of the magnetic head 111 is not necessary, the supply voltage to the MA 115 may be zero or may be a fixed voltage.

Figure 4:
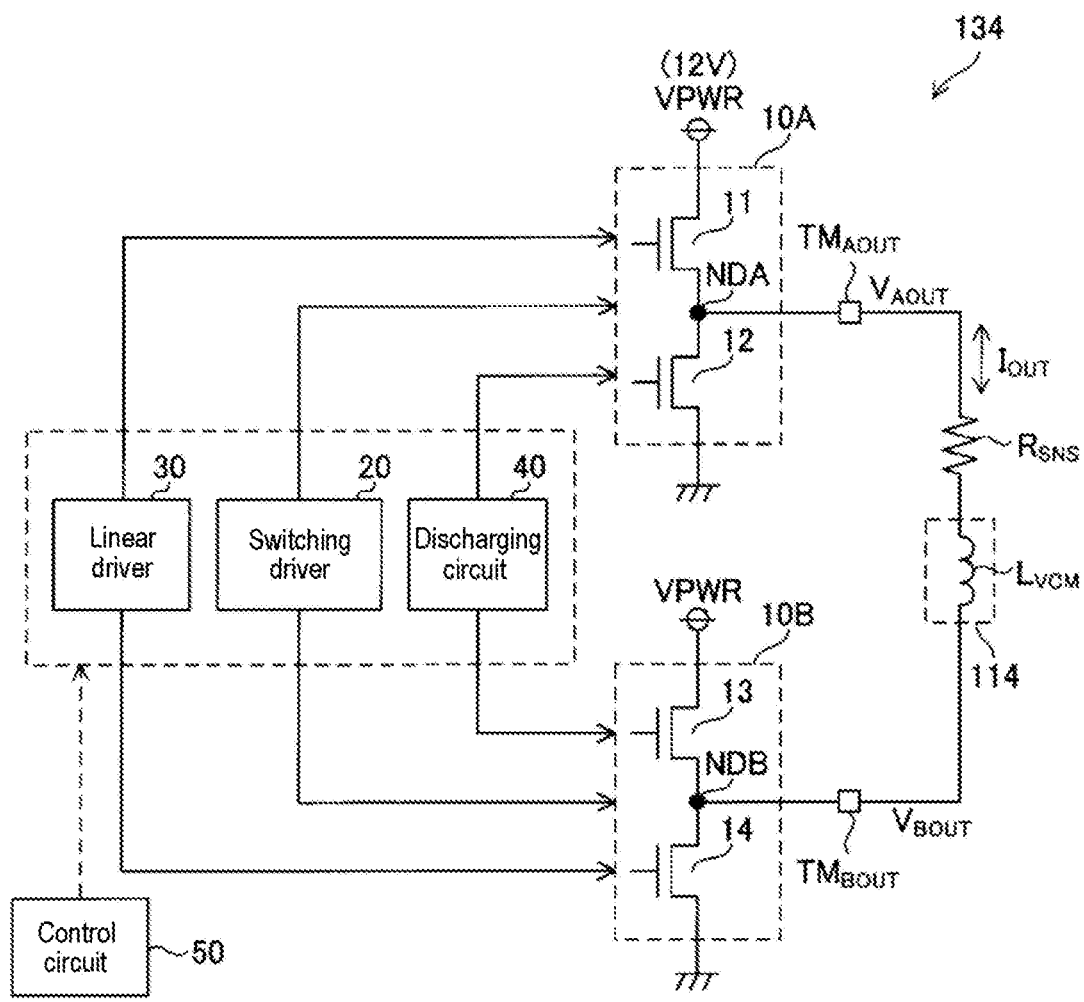
FIG. 4 is a schematic configuration diagram of a main part of a VCM driver according to an embodiment of the present disclosure.

FIG. 4 illustrates a schematic configuration of a main part of the VCM driver 134. The VCM 114 includes two permanent magnets, and a coil $L_{VCM}$ arranged in a magnetic field formed by the two permanent magnets. $I_{OUT}$ indicates a motor current (driving current) which is a current flowing through the coil $L_{VCM}$ (in other words, a current flowing through the VCM 114).

The VCM driver 134 includes a first channel half-bridge circuit 10A and a second channel half-bridge circuit 10B, and constitutes a full-bridge circuit for the VCM 114 using the half-bridge circuits 10A and 10B. Specifically, each of the half-bridge circuits 10A and 10B includes two power transistors connected in series between a power supply voltage part to which a power supply voltage VPWR is applied and a reference potential part to which a ground potential is applied. Among these two power transistors, the power transistor connected to the power supply voltage part may be referred to as a high-side transistor, and the power transistor connected to the reference potential part may be referred to as a low-side transistor. The high-side transistor and the low-side transistor in the half-bridge circuit 10A are respectively referred to by reference numerals "11" and "12", and the high-side transistor and the low-side transistor in the half-bridge circuit 10B are referred to by reference numerals "13" and "14," respectively. The power supply voltage VPWR has a predetermined positive DC voltage value, and in this case, for example, the power supply voltage VPWR is 12 volt (V).

The power transistors 11 to 14 are configured as N-channel metal-oxide-semiconductor field-effect transistors (MOSFETs). Although not shown, in the MOSFET constituting each of the power transistors 11 to 14, a parasitic diode whose forward direction is from a source to a drain of the MOSFET is formed and connected in parallel to the MOSFET. A modification in which the power transistors 11 and 13 are configured as P-channel MOSFETs is also possible.

In the half-bridge circuit 10A, a drain of the transistor 11 is connected to the power supply voltage part to which the power supply voltage VPWR is applied, a source of the transistor 12 is connected to the reference potential part to which the ground potential is applied, and a source of the transistor 11 and a drain of the transistor 12 are commonly connected by a node NDA. In the half-bridge circuit 10B, a drain of the transistor 13 is connected to the power supply voltage part to which the power supply voltage VPWR is applied, a source of the transistor 14 is connected to the reference potential part to which the ground potential is applied, and a source of the transistor 13 and a drain of the transistor 14 are commonly connected by a node NDB.

The node NDA is connected to an output terminal $TM_{AOUT}$, and the node NDB is connected to an output terminal $TM_{BOUT}$. A voltage applied to the output terminal $TM_{AOUT}$ is indicated by "$V_{AOUT}$," and a voltage applied to the output terminal $TM_{BOUT}$ is indicated by "$V_{BOUT}$."

A series circuit of a sense resistor $R_{SNS}$ and the VCM 114 is inserted between the output terminals $TM_{AOUT}$ and $TM_{BOUT}$. More specifically, one end of the sense resistor $R_{SNS}$ is connected to the output terminal $TM_{AOUT}$, one end of the VCM 114 (i.e., one end of the coil $L_{VCM}$) is connected to the output terminal $TM_{BOUT}$, and the other end of the sense resistor $R_{SNS}$ and the other end of the VCM 114 (i.e., the other end of the coil $L_{VCM}$) is commonly connected by a terminal $TM_{ISNS}$. The sense resistor $R_{SNS}$ is installed for detecting the motor current $I_{OUT}$. The terminals $TM_{AOUT}$, $TM_{BOUT}$, and $TM_{ISNS}$ are included in a plurality of external terminals installed in the driver IC 130.

The motor current tour flows between the output terminals $TM_{AOUT}$ and $TM_{BOUT}$ through the series circuit of the sense resistor $R_{SNS}$ and the coil $L_{VCM}$. It is assumed here that the polarity of the motor current $I_{OUT}$ flowing from the terminal $TM_{AOUT}$ toward the terminal $TM_{BOUT}$ is positive and the polarity of the motor current tour flowing from the terminal $TM_{BOUT}$ toward the terminal $TM_{AOUT}$ is negative. By supplying the positive motor current $I_{OUT}$ to the coil $L_{VCM}$, the head 111 moves from the outer peripheral side of the magnetic disk 110 toward the center of the magnetic disk 110, and by supplying the negative motor current $I_{OUT}$ to the coil $L_{VCM}$, the head 111 moves from the center of the magnetic disk 110 toward the outer periphery of the magnetic disk 110.

The VCM driver 134 includes a switching driver 20 which performs switching driving, a linear driver 30 which performs linear driving, a discharging circuit 40 which can individually discharge the gate charges of the power transistors 11 to 14, and a control circuit 50 which controls operations of the switching driver 20, the linear driver 30 and the discharging circuit 40. Considering that a final driver which drives the VCM 114 by supplying electric power to the VCM 114 is the full-bridge circuit, the switching driver 20 may be referred to as a switching pre-driver. Similarly, the linear driver 30 may be referred to as a linear pre-driver.

In the VCM driver 134, the switching driving method and the linear driving method are switched and used as the driving method of the VCM 114. A driving mode in which the switching driving method is used as the driving method of the VCM 114 will be referred to as a switching driving mode, and a driving mode in which the linear driving method is used as the driving method of the VCM 114 will be referred to as a linear driving mode. The control circuit 50 can switch and set the driving mode of the VCM 114 (in other words, the operation mode of the VCM driver 134) between the switching driving mode and the linear driving mode.

A PWM driving method is used herein as the switching driving method. In the PMW driving method, power is intermittently supplied to the VCM 114 by supplying a rectangular wave-shaped voltage, which is a pulse width modulated voltage, as the driving voltage of the VCM 114. On the other hand, in the linear driving method, power is always supplied to the VCM 114 by supplying a continuous voltage, which is not pulse width modulated, as the driving voltage of the VCM 114.

That is, in the switching driving mode, the switching driver 20 is active to perform the switching driving in which a switching voltage (pulse width modulated voltage) is supplied from the full-bridge circuit to the VCM 114. More specifically, in the switching driving mode, the power transistors 11 to 14 are switched by the switching driver 20 based on a PWM signal generated based on a detection result of the motor current $I_{OUT}$, and as a result, the switching voltage, which is a voltage obtained by pulse width modulating the power supply voltage VPWR, is supplied to the VCM 114.

On the other hand, in the linear driving mode, the linear driver 30 is active to perform the linear driving in which a linear voltage is supplied from the full-bridge circuit to the VCM 114. That is, in the linear driving mode, a continuous motor current $I_{OUT}$ is supplied to the VCM 114 by supplying a continuous voltage which is not pulse width modulated as the linear voltage to the VCM 114 according to a signal generated based on a detection result of the motor current LOUT.

For any FET, when a gate-source voltage is lower than a predetermined gate threshold voltage (gate cut-off voltage), the FET is turned off, and when the gate-source voltage is sufficiently higher than the predetermined gate threshold voltage, the FET is turned on. When the FET is regarded as a switching element, the region and state in which the FET is turned off will be generally referred to as a cut-off region and a cut-off state, respectively, and the region and state in which the FET is turned on will be generally referred to as a saturation region and a saturation state, respectively. Furthermore, for any FET, the gate-source voltage refers to a gate potential of the FET viewed from the source potential of the FET. The switching driver 20 switches the states of the power transistors 11 to 14 between ON and OFF using the power transistors 11 to 14 as switching elements. In the switching driving mode, when the power transistor 11 is turned on, the power transistor 12 is turned off, and when the power transistor 11 is turned off, the power transistor 12 is turned on. Similarly, when the power transistor 13 is turned on, the power transistor 14 is turned off, and when the power transistor 13 is turned off, the power transistor 14 is turned on. However, a dead time for avoiding two power transistors connected in series from being simultaneously turned on is suitably inserted.

On the other hand, in the linear driving mode, a linear region (active region) is also used for the power transistors 11 to 14, and the motor current $I_{OUT}$ can be controlled by using one or more of the power transistors 11 to 14 as variable resistors. That is, when the positive motor current $I_{OUT}$ is supplied to the VCM 114 in the linear driving mode, the linear driver 30 can control the gate-source voltages of the power transistors 11 and 14 and control the motor current $I_{OUT}$ accordingly, for example, so that the power transistors 11 and 14 operate in the linear region with the power transistors 12 and 13 turned off.

FIGS. 5A to 5D illustrate current paths A to C and Z which may be paths through which the motor current $I_{OUT}$ flows when the positive motor current $I_{OUT}$ flows. Illustration of the sense resistor $R_{SNS}$ is omitted in FIGS. 5A to 5D and FIG. 6 as described below. When the positive motor current $I_{OUT}$ flows, the motor current $I_{OUT}$ flows through one of the current paths A, B, and C in the switching driving mode. Hereinafter, a path through which the motor current $I_{OUT}$ flows may be referred to as a motor current path.

Figure 5A:
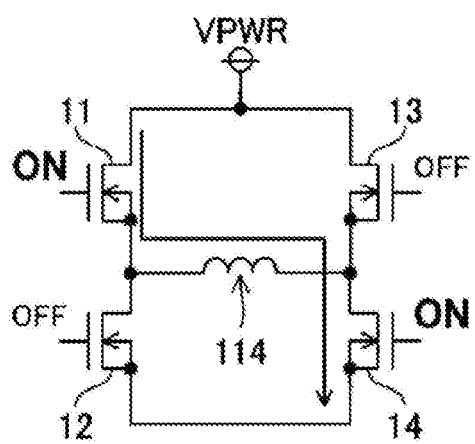
FIGS. 5A to 5D are diagrams illustrating a path through which a motor current flows in a switching driving mode.

In a situation where the positive motor current $I_{OUT}$ flows, when the power transistors 11 and 14 are turned on and the power transistors 12 and 13 are turned off (hereinafter, referred to as a first ON/OFF state), the motor current path is current path A. As illustrated in FIG. 5A, the motor current $I_{OUT}$ along the current path A flows from the power supply voltage part to the reference potential part (ground) through the power transistor 11, the VCM 114, and the power transistor 14 in this order.

Figure 5B:
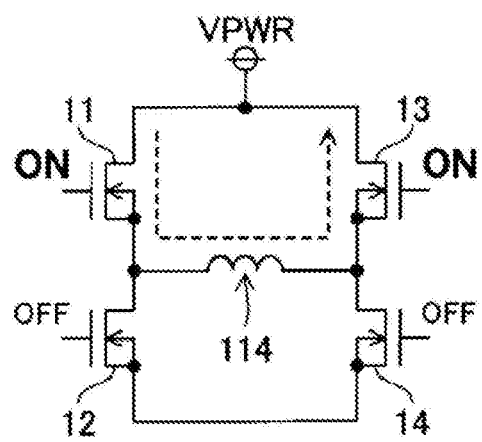

In a situation where the positive motor current $I_{OUT}$ flows, when the power transistors 11 and 13 are turned on and the power transistors 12 and 14 are turned off (hereinafter, referred to as a second ON/OFF state), the motor current path is current path B. As illustrated in FIG. 5B, the motor current $I_{OUT}$ along the current path B flows from the power supply voltage part to the power supply voltage part through the power transistor 11, the VCM 114, and the power transistor 13 in this order.

Figure 5C:
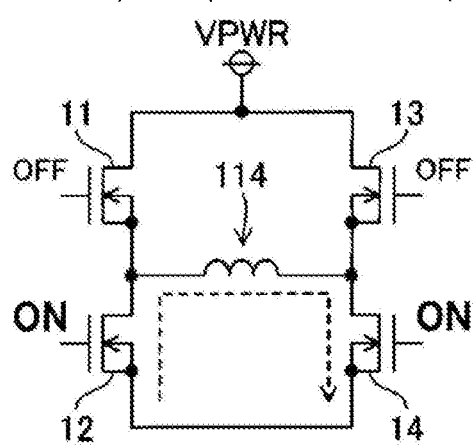

In a situation where the positive motor current $I_{OUT}$ flows, when the power transistors 12 and 14 are turned on and the power transistors 11 and 13 are turned off (hereinafter, referred to as a third ON/OFF state), the motor current path is current path C. As illustrated in FIG. 5C, the motor current $I_{OUT}$ along the current path C flows from the reference potential part (ground) to the reference potential part (ground) through the power transistor 12, the VCM 114, and the power transistor 14 in this order.

Power based on the power supply voltage VPWR is supplied to the VCM 114 and the motor current $I_{OUT}$ increases only in the first ON/OFF state among the first to third ON/OFF states.

Figure 5D:
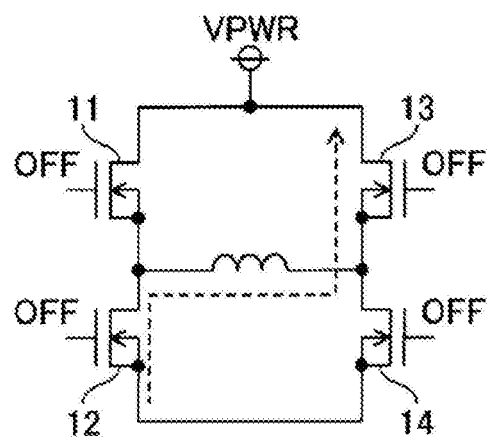

Furthermore, in a situation where the positive motor current lour flows, when the power transistors 11 to 14 are all turned off (hereinafter, referred to as a fourth ON/OFF state), the motor current path is current path Z. As illustrated in FIG. 5D, the motor current $I_{OUT}$ along the current path Z flows as a regenerative current from the reference potential part (ground) to the power supply voltage part through the power transistor 12 (specifically, a parasitic diode of the power transistor 12), the VCM 114, and the power transistor 13 (specifically, a parasitic diode of the power transistor 13) in this order.

On the other hand, when the positive motor current $I_{OUT}$ flows in the linear driving mode, the motor current path is current path L in FIG. 6, and similar to the current path A in FIG. 5A, the motor current $I_{OUT}$ along the current path L flows from the power supply voltage part to the reference potential part (ground) through the power transistor 11, the VCM 114, and the power transistor 14 in this order.

The control circuit 50 performs control in consideration of the identity of the current path A and the current path L when switching from the switching driving mode to the linear driving mode, which will be described below.

Figure 7:
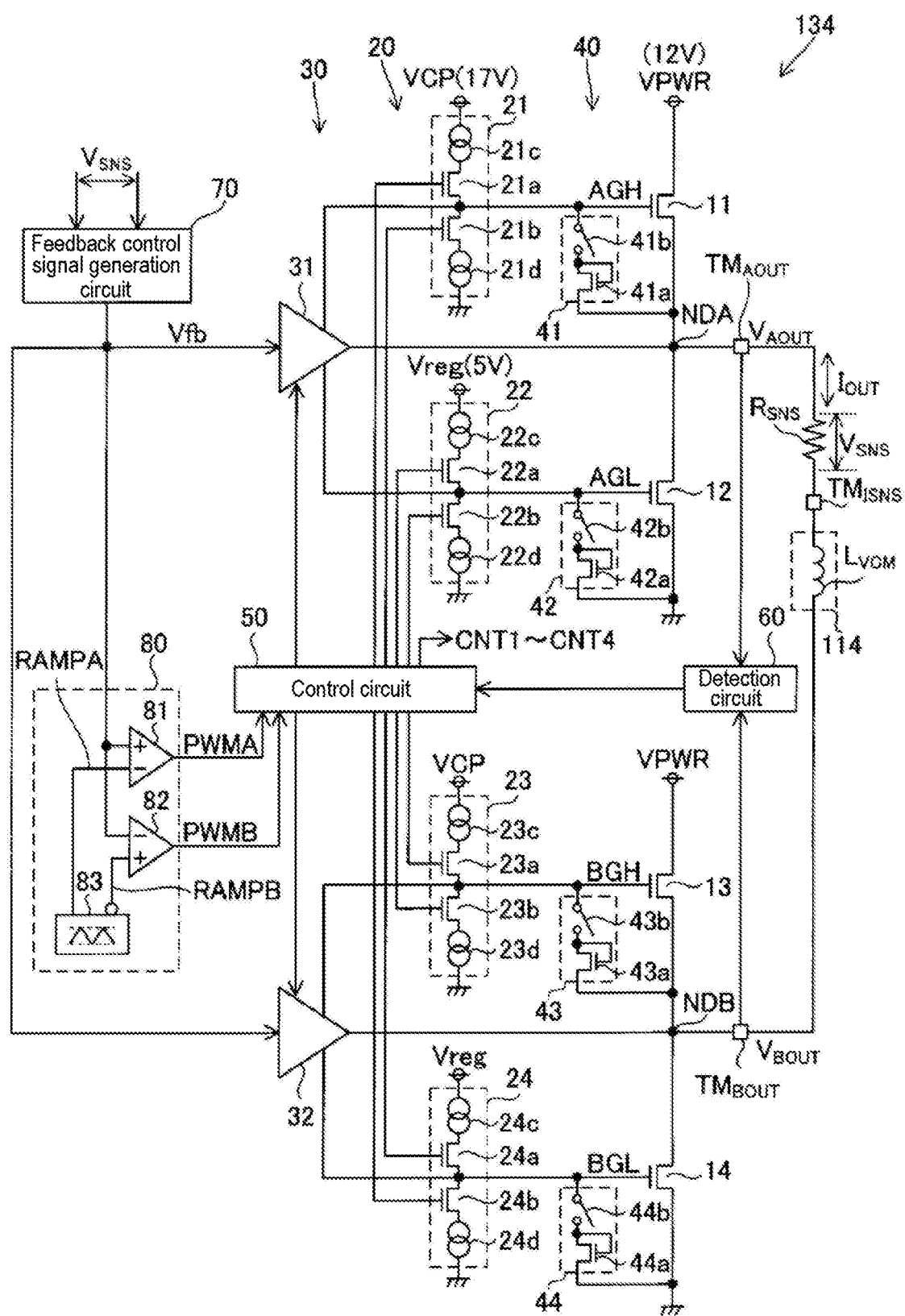
FIG. 7 is a diagram illustrating a detailed configuration example of the VCM driver according to an embodiment of the present disclosure.

FIG. 7 illustrates a detailed configuration example of the VCM driver 134. In FIG. 7, the switching driver 20 includes switching drivers 21 to 24 which will also be referred to as individual switching drivers for the power transistors 11 to 14. In FIG. 7, the linear driver 30 includes a linear driver 31 for the power transistors 11 and 12 and a linear driver 32 for the power transistors 13 and 14. In FIG. 7, the discharging circuit 40 includes discharging circuits 41 to 44 which will also be referred to as individual discharging circuits for the power transistors 11 to 14. Furthermore, as portions not particularly illustrated in FIG. 6, a detection circuit 60, a feedback control signal generation circuit 70, and a PWM signal generation circuit 80 are installed in the VCM driver 134. Gate signals applied to the gates of the power transistors 11, 12, 13, and 14 are respectively indicated by "AGH," "AGL," "BGH," and "BGL." When attention is drawn to the voltage, the gate signals will also be referred to as gate voltages.

The switching driver 21 includes transistors 21*a* and 21*b* and constant current circuits 21*c* and 21*d*, and turns the power transistor 11 on or off by setting the gate signal AGH to a high level or a low level based on a signal PWMA as described below in the switching driving mode. The switching driver 22 includes transistors 22*a* and 22*b* and constant current circuits 22*c* and 22*d*, and turns the power transistor 12 on or off by setting the gate signal AGL to a high level or a low level based on the signal PWMA as described below in the switching driving mode. The switching driver 23 includes transistors 23*a* and 23*b* and constant current circuits 23*c* and 23*d*, and turns the power transistor 13 on or off by setting the gate signal BGH to a high level or a low level based on a signal PWMB as described below in the switching driving mode. The switching driver 24 includes transistors 24*a* and 24*b* and constant current circuits 24*c* and 24*d*, and turns the power transistor 14 on or off by setting the gate signal BGL to a high level or a low level based on the signal PWMB as described below in the switching driving mode.

Each transistor in the switching drivers 21 to 24 is configured as an N-channel MOSFET. The high levels of the gate signals AGH and BGH have a potential of an internal power supply voltage VCP, and the low levels of the gate signals AGH and BGH have a ground potential. The internal power supply voltage VCP is higher than the power supply voltage VPWR, and it is assumed here to be 17 V. The high levels of the gate signals AGL and BGL have a potential of an internal power supply voltage Vreg, and the low levels of the gate signals AGL and BGL have a ground potential. The internal power supply voltage Vreg may be lower than the power supply voltage VPWR, and it is assumed here to be 5 V.

In the switching driver 21, the transistors 21*a* and 21*b* respectively function as first and second transistors, the constant current circuits 21*c* and 21*d* respectively function as first and second constant current circuits, and the power transistor 11 functions as a target transistor.

In the switching driver 22, the transistors 22*a* and 22*b* respectively function as first and second transistors, the constant current circuits 22*c* and 22*d* respectively function as first and second constant current circuits, and the power transistor 12 functions as a target transistor.

In the switching driver 23, the transistors 23*a* and 23*b* respectively function as first and second transistors, the constant current circuits 23*c* and 23*d* respectively function as first and second constant current circuits, and the power transistor 13 functions as a target transistor.

In the switching driver 24, the transistors 24*a* and 24*b* respectively function as first and second transistors, the constant current circuits 24*c* and 24*d* respectively function as first and second constant current circuits, and the power transistor 14 functions as a target transistor.

The switching drivers 21 to 24 have the same configuration, and are connected and operate as follows.

A source of the first transistor and a drain of the second transistor are connected to a gate of the target transistor, the first transistor is arranged between the first constant current circuit and the gate of the target transistor, and the second transistor is arranged between the second constant current circuit and the gate of the target transistor. In the switching driving mode, one of the first and second transistors is turned on and the other is turned off.

When the first transistor is turned on, a constant current from the first constant current circuit flows into the gate of the target transistor through the first transistor to increase the gate voltage of the target transistor, thereby turning on the target transistor. However, the rise in the gate voltage of the target transistor allows the internal power supply voltage (VCP for the drivers 21 and 23 and Vreg for the drivers 22 and 24) to be the upper limit.

When the second transistor is turned on, the second constant current circuit draws the gate charge of the target transistor by the constant current through the second transistor to lower the gate voltage of the target transistor, thereby turning off the target transistor. However, the lowering of the gate voltage of the target transistor allows the ground potential to be the lower limit.

The linear driver 31 is connected to each gate of the power transistors 11 and 12 and the node NDA, and controls the gate voltages AGH and AGL based on a feedback control voltage Vfb as described below in the linear driving mode. The linear driver 32 is connected to each gate of the power transistors 13 and 14 and the node NDB, and controls the gate voltages BGH and BGL based on the feedback control voltage Vfb as described below in the linear driving mode.

The discharging circuit 41 includes a discharging transistor 41*a* and a switch 41*b*, the discharging circuit 42 includes a discharging transistor 42*a* and a switch 42*b*, the discharging circuit 43 includes a discharging transistor 43*a* and a switch 43*b*, and the discharging circuit 44 includes a discharging transistor 44*a* and a switch 44*b*. The discharging transistors 41*a* to 44*a* are configured as N-channel MOSFETs. In each of the discharging transistors 41*a* to 44*a*, a drain and a gate are short-circuited. That is, each of the discharging transistors 41*a* to 44*a* is diode-connected.

Furthermore, the drain and the gate of the discharging transistor 41*a* are connected to the gate of the power transistor 11 via the switch 41*b*, and a source of the discharging transistor 41*a* is connected to the node NDA. The drain and the gate of the discharging transistor 42*a* are connected to the gate of the power transistor 12 via the switch 42*b*, and a source of the discharging transistor 42*a* is connected to the ground. The drain and the gate of the discharging transistor 43a are connected to the gate of the power transistor 13 via the switch 43b, and a source of the discharging transistor 43a is connected to the node NDB. The drain and the gate of the discharging transistor 44a are connected to the gate of the power transistor 14 via the switch 44b, and a source of the discharging transistor 44a is connected to the ground. The switches 41b to 44b are controlled to be turned on and off based on control signals CNT1 to CNT4, respectively, from the control circuit 50.

The output terminals $TM_{AOUT}$ and $TM_{BOUT}$ are connected to the detection circuit 60. The function of the detection circuit 60 will be described below.

Figure 8A:
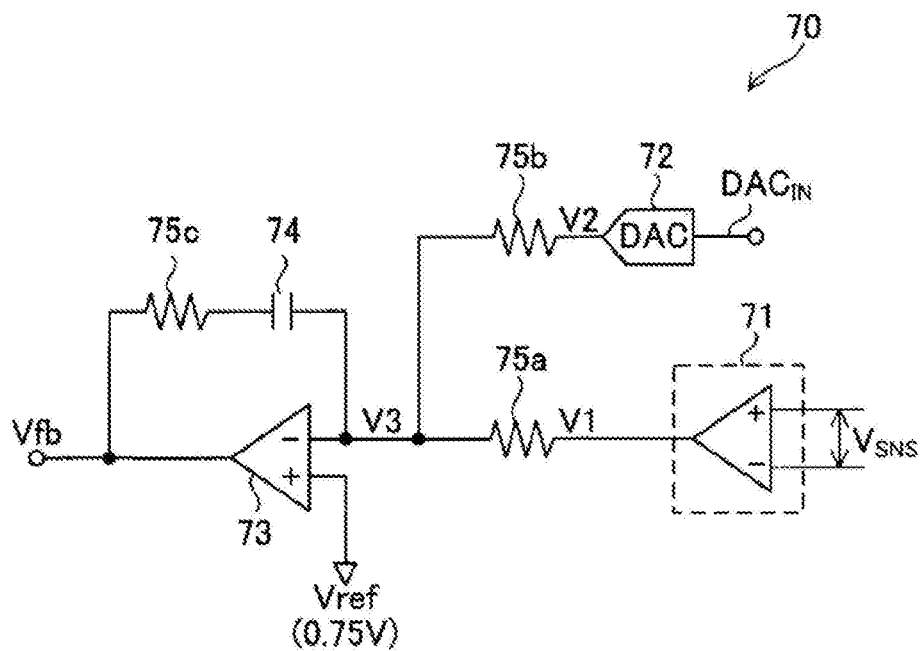
FIGS. 8A and 8B are diagrams illustrating a configuration example of a feedback control signal generation circuit according to an embodiment of the present disclosure.

The feedback control signal generation circuit 70 generates the feedback control voltage Vfb as a feedback control signal corresponding to the motor current $I_{OUT}$ based on a voltage $V_{SNS}$ generated in the sense resistor $R_{SNS}$. FIG. 8A illustrates a circuit example of the feedback control signal generation circuit 70. The feedback control signal generation circuit 70 in FIG. 8A includes a current sense circuit 71, a DAC 72, an operational amplifier 73, a capacitor 74, and resistors 75a to 75c.

Figure 8B:
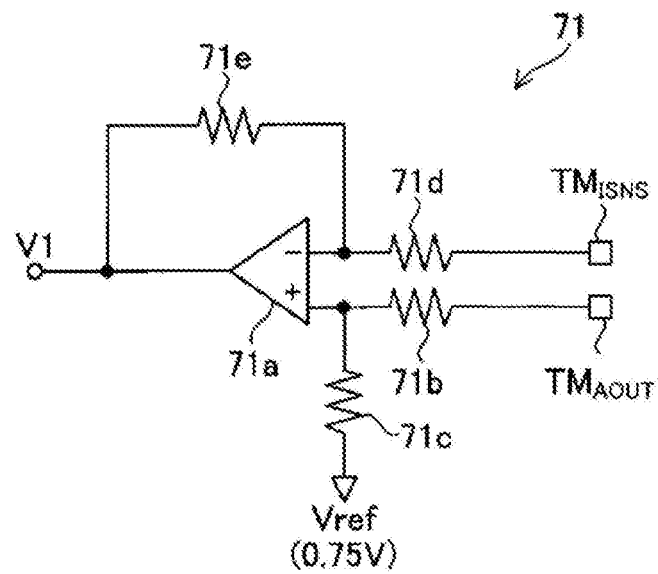

The current sense circuit 71 is connected to both ends of the sense resistor $R_{SNS}$, and generates a detection voltage V1 obtained by amplifying the voltage $V_{SNS}$ generated in the sense resistor $R_{SNS}$. The detection voltage V1 has a voltage value indicating a magnitude and direction of the motor current $I_{OUT}$. More specifically, for example, as illustrated in FIG. 8B, the current sense circuit 71 includes an operational amplifier 71a and resistors 71b to 71e. Furthermore, a non-inverting input terminal of the operational amplifier 71a is connected to the terminal $TM_{AOUT}$ via the resistor 71b, while it is connected to a terminal to which a predetermined reference voltage Vref is applied via the resistor 71c. The reference voltage Vref is assumed here to be 0.75 V. An inverting input terminal of the operational amplifier 71a is connected to the terminal $TM_{ISNS}$ via the resistor 71d, while it is connected to an output terminal of the operational amplifier 71a via the resistor 71e to generate the detection voltage V1 at the output terminal of the operational amplifier 71a.

The DAC 72 is a digital/analog converter that converts a digital signal $DAC_{IN}$ which specifies the magnitude and direction of the motor current $I_{OUT}$ into an analog control voltage V2 and outputs it. The digital signal $DAC_{IN}$ is supplied from, for example, the MPU 122. However, the digital signal $DAC_{IN}$ may be generated in the driver IC 130. The digital signal $DAC_{IN}$ may also be said to be a current command signal, and since the torque of the VCM 114 depends on the motor current $I_{OUT}$, the digital signal $DAC_{IN}$ may also be said to be a torque command signal. The VCM driver 134 supplies the motor current $I_{OUT}$ corresponding to the digital signal $DAC_{IN}$ to the VCM 114.

A line to which the detection voltage V1 output from the current sense circuit 71 is applied is connected to an inverting input terminal of the operational amplifier 73 via the resistor 75a, and a line to which the control voltage V2 output from the DAC 72 is applied is connected to the inverting input terminal of the operational amplifier 73 via the resistor 75b. The predetermined reference voltage Vref is applied to a non-inverting input terminal of the operational amplifier 73. A voltage input to the inverting input terminal of the operational amplifier 73 based on the detection voltage V1 and the control voltage V2 will be referred to as a voltage V3.

The operational amplifier 73 functions as an error amplifier which amplifies an error between the voltage V3 and the reference voltage Vref and outputs the amplified error as the feedback control voltage Vfb from its output terminal. It is assumed here that the operational amplifier 73, the capacitor 74, and the resistor 75c constitute an integrator. Specifically, a series circuit of the capacitor 74 and the resistor 75c is inserted between the inverting input terminal and the output terminal of the error amplifier 73. Furthermore, among the components illustrated in FIG. 8A, the capacitor 74 and the resistor 75c may be components which are not installed in the driver IC 130 but externally connected to the driver IC 130.

Figure 9:
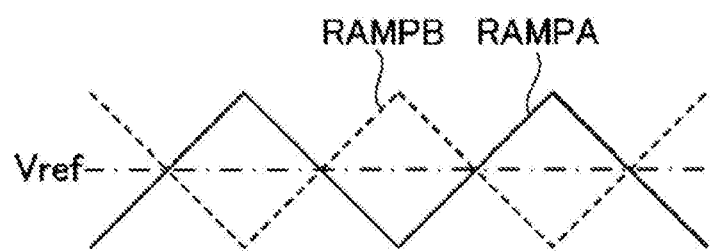
FIG. 9 is a waveform diagram of two lamp voltages according to an embodiment of the present disclosure.

Referring back to FIG. 7, the feedback control voltage Vfb is input to the linear drivers 31 and 32 and the PWM signal generation circuit 80. The PWM signal generation circuit 80 includes comparators 81 and 82 and a ramp voltage generation circuit 83. The ramp voltage generation circuit 83 generates ramp voltages RAMPA and RAMPB whose voltage values periodically vary. As illustrated in FIG. 9, it is assumed here that the ramp voltages RAMPA and RAMPB are triangular wave signals whose voltage values vary in a triangular wave shape with a predetermined PWM cycle around the reference voltage Vref. However, the ramp voltage RAMPB is an inverted signal of the ramp voltage RAMPA.

The comparator 81 generates a signal PWMA based on a comparison result between the ramp voltage RAMPA and the feedback control voltage Vfb, and the comparator 82 generates a signal PWMB based on a comparison result between the ramp voltage RAMPB and the feedback control voltage Vfb. Each of the signals PWMA and PWMB is a PWM signal (pulse width modulation signal) having a high level or a low level. When the feedback control voltage Vfb is higher than the ramp voltage RAMPA, the signal PWMA is at a high level, and otherwise, the signal PWMA is at a low level. When the ramp voltage RAMPB is higher than the feedback control voltage Vfb, the signal PWMB is at a high level, and otherwise, the signal PWMB is at a low level. The signals PMWA and PMWB are supplied to the control circuit 50 which controls the switching drivers 21 to 24 based on the signals PMWA and PMWB in the switching driving mode.

An operation in the switching driving mode will be described. In the switching driving mode, the control circuit 50 makes the switching driver 20 active and makes the linear driver 30 inactive.

When the switching driver 20 is active, it may indicate that the signal PWMA is transmitted to the switching drivers 21 and 22 and the signal PWMB is transmitted to the switching drivers 23 and 24 to perform the control of the gate voltages AGH, AGL, BGH and BGL by the switching drivers 21 to 24, respectively, and the ON/OFF control of the power transistors 11 to 14 by the switching drivers 21 to 24, respectively.

When the linear driver 30 is inactive, it may indicate that the outputs of the linear drivers 31 and 32 are in a high impedance state. When the linear driver 30 is inactive, the linear drivers 31 and 32 do not perform input and output of charges that affect the gate voltages AGH, AGL, BGH and BGL.

In the switching driving mode, the switching drivers 21 to 24 switch the power transistors 11 to 14 ON and OFF based on the signals PWMA and PWMB so that the motor current $I_{OUT}$ corresponding to the control voltage V2 (i.e., the motor current $I_{OUT}$ having the magnitude and direction specified by the digital signal $DAC_{IN}$) is supplied to the VCM 114, and perform switching control. In the switching driving mode, since the motor current $I_{OUT}$ becomes a pulsating current, specifically, the DC component of the motor current $I_{OUT}$ is dependent on the specified contents of the digital signal $DAC_{IN}$.

Figure 10:
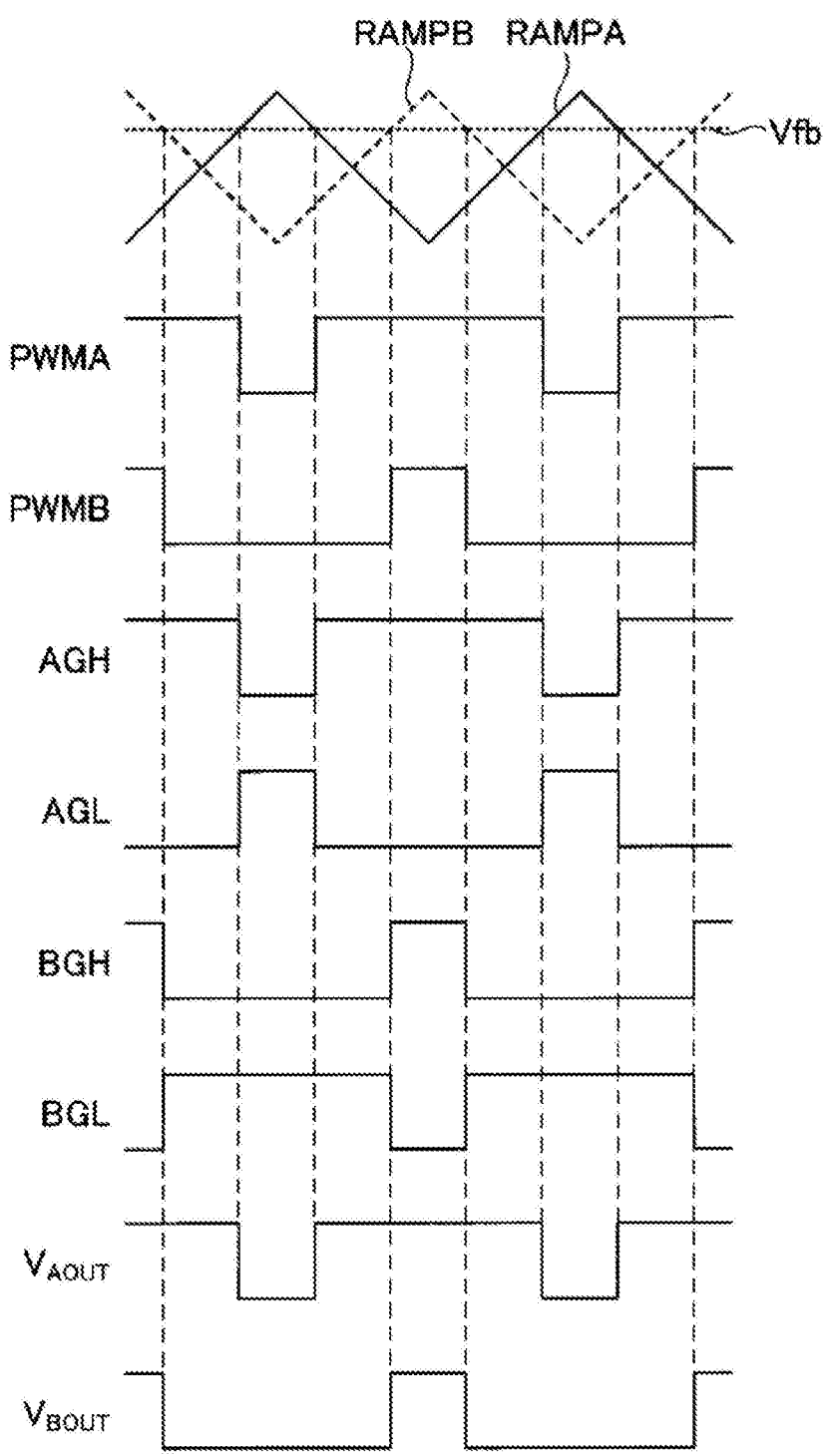
FIG. 10 is a diagram illustrating a relationship between signals and voltages associated with PWM control in the switching driving mode according to an embodiment of the present disclosure.

FIG. 10 illustrates a relationship between signals and voltages associated with the PWM control in the switching driving mode.

In the switching driving mode, when the signal PWMA is at a high level, the transistors 21a and 21b are respectively turned on and off so that the gate voltage AGH is at a high level, and the transistors 22a and 22b are respectively turned off and on so that the gate voltage AGL is at a low level. As a result, the power transistors 11 and 12 are respectively turned on and off so that the voltage $VB_{OUT}$ is at a high level. The high level in the voltage $VB_{OUT}$ corresponds to the level of the power supply voltage VPWR.

In the switching driving mode, when the signal PWMA is at a low level, the transistors 21a and 21b are respectively turned off and on so that the gate voltage AGH is at a low level, and the transistors 22a and 22b are respectively turned on and off so that the gate voltage AGL is at a high level. As a result, the power transistors 11 and 12 are respectively turned off and on so that the voltage $VB_{OUT}$ is at a low level. The low level in the voltage $VB_{OUT}$ corresponds to the ground level.

In the switching driving mode, when the signal PWMB is at a high level, the transistors 23a and 23b are respectively turned on and off so that the gate voltage BGH is at a high level, and the transistors 24a and 24b are respectively turned off and on so that the gate voltage BGL is at a low level. As a result, the power transistors 13 and 14 are respectively turned on and off so that the voltage $VB_{OUT}$ is at a high level. The high level in the voltage $VB_{OUT}$ corresponds to the level of the power supply voltage VPWR.

In the switching driving mode, when the signal PWMB is at a low level, the transistors 23a and 23b are respectively turned off and on so that the gate voltage BGH is at a low level, and the transistors 24a and 24b are respectively turned on and off so that the gate voltage BGL is at a high level. As a result, the power transistors 13 and 14 are respectively turned off and on so that the voltage $V_{BOUT}$ is at a low level. The low level in the voltage $V_{BOUT}$ corresponds to the ground level.

Figure 11A:
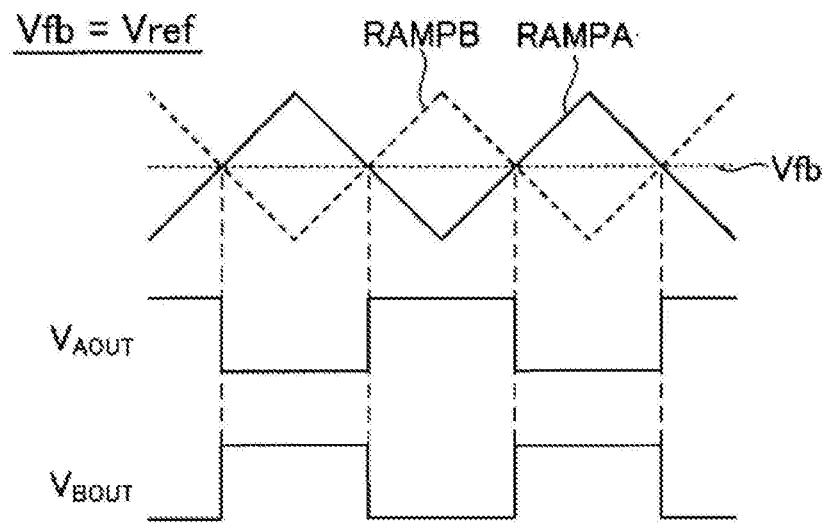
FIGS. 11A to 11C are waveform diagrams of signals and voltages in the switching driving mode according to an embodiment of the present disclosure.
Figure 11B:
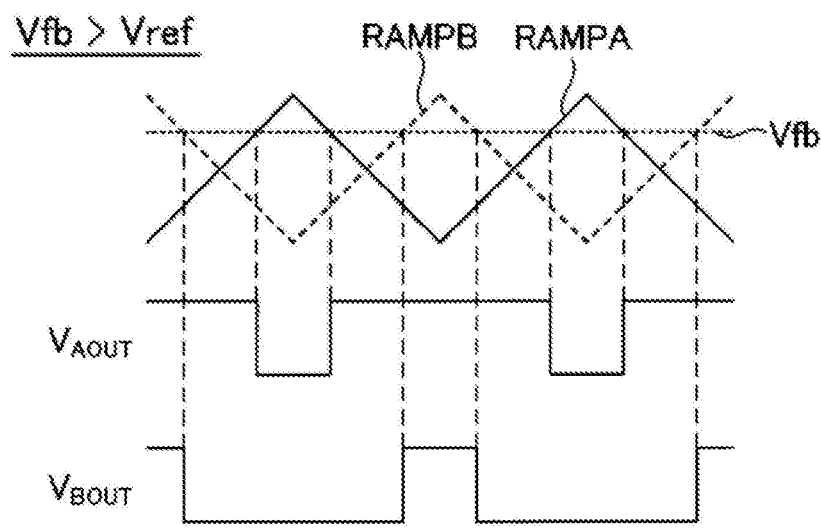
Figure 11C:
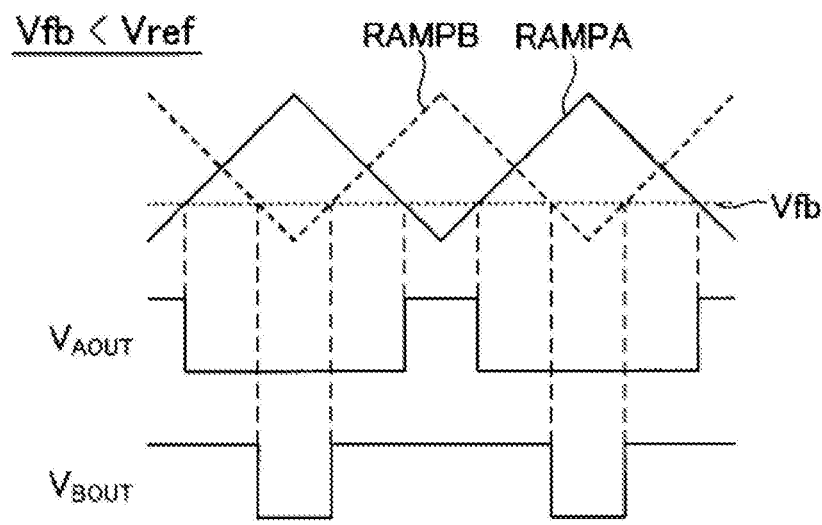

FIGS. 11A to 11C illustrate examples of relationships among the ramp voltages RAMPA and RAMPB, the feedback control voltage Vfb, and the voltages $VB_{OUT}$ and $V_{BOUT}$ in the switching driving mode. However, FIGS. 11A, 11B, and 11C illustrate examples of their relationships when "Vfb=Vref," "Vfb>Vref," and "Vfb<Vref," respectively. In the switching driving mode, the duty of the voltage $VB_{OUT}$ is 50% when "Vfb=Vref," more than 50% when "Vfb>Vref," and smaller than 50% when "Vfb<Vref." The duty of voltage $VB_{OUT}$ is obtained by subtracting the duty of voltage $VB_{OUT}$ from 100%.

Figure 12:
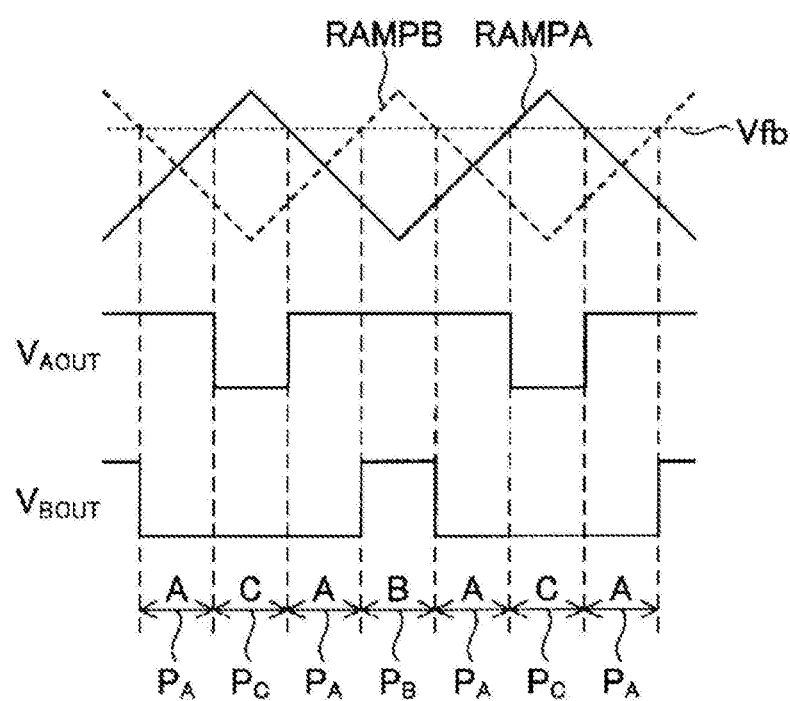
FIG. 12 is a diagram illustrating that three sections are defined in association with waveforms of signals and voltages in the switching driving mode according to an embodiment of the present disclosure.

Referring to FIG. 12, attention is drawn to a section where "Vfb>Vref" is established. In the switching driving mode, the positive motor current $I_{OUT}$ flows in the section where "Vfb>Vref" is established. As illustrated in FIG. 12, this section is roughly classified into a section PA where the voltage $VB_{OUT}$ is at a high level and the voltage $VB_{OUT}$ is at a low level, a section PB where both the voltages $VB_{OUT}$ and $VB_{OUT}$ are at a high level, and a section PC where both the voltages $VB_{OUT}$ and $VB_{OUT}$ are at a low level. In the section PA, the power transistors 11 to 14 are in the first ON/OFF state and the motor current path is the current path A (see FIG. 5A). In the section PB, the power transistors 11 to 14 are in the second ON/OFF state and the motor current path is the current path B (see FIG. 5B). In the section PC, the power transistors 11 to 14 are in the third ON/OFF state and the motor current path is the current path C (see FIG. 5C). In the switching driving mode, since there is not a section where the regenerative current flows from the ground to the power supply voltage part through the power transistor 12, the VCM 114, and the power transistor 13 (i.e., a section where the motor current $I_{OUT}$ flows along the current path Z in FIG. 5D), the power supply voltage VPWR is suppressed from excessively rising due to the regenerative current. However, in the switching driving mode when the positive motor current $I_{OUT}$ flows, a modification in which the switching driving is performed such that the motor current path is switched among the current paths A, B, C, and Z is also possible.

An operation in the linear driving mode will be described. In the linear driving mode, the control circuit 50 makes the switching driver 20 inactive and makes the linear driver 30 active.

When the switching driver 20 is inactive, it may indicate that the transistors 21a, 21b, 22a, 22b, 23a, 23b, 24a and 24b are all kept in the OFF state regardless of the signals PWMA and PWMB, and the outputs of the switching drivers 21 to 24 are in a high impedance state. When the switching driver 20 is inactive, the switching drivers 21 to 24 do not perform input and output of charges that affect the gate voltages AGH, AGL, BGH, and BGL.

When the linear driver 30 is active, the linear drivers 31 and 32 control the gate voltages AGH, AGL, BGH, and BGL according to the feedback control voltage Vfb.

That is, in the linear driving mode, the linear drivers 31 and 32 control the gate voltages AGH, AGL, BGH, and BGL based on the feedback control voltage Vfb and control the voltages $VB_{OUT}$ and $VB_{OUT}$ accordingly so that the motor current $I_{OUT}$ (i.e., the motor current $I_{OUT}$ having the magnitude and direction specified by the digital signal $DAC_{IN}$) corresponding to the control voltage V2 is supplied to the VCM 114. The supply voltage to the VCM 114 (i.e., the difference voltage between the voltages $V_{AOUT}$ and $VB_{OUT}$) and each of the voltages $V_{AOUT}$ and $VB_{OUT}$ are switching voltages close to rectangular waves in the switching driving mode, but are continuous linear voltages in the linear driving mode.

Specifically, the linear driver 31 operates to raise the gate voltage AGH and lower the gate voltage AGL when "Vfb>Vref" is established in comparison with when "Vfb=Vref" is established. In contrast, the linear driver 31 operates to lower the gate voltage AGH and raise the gate voltage AGL when "Vfb<Vref" is established.

The linear driver 32 operates to lower the gate voltage BGH and raise the gate voltage BGL when "Vfb>Vref" is established in comparison with when "Vfb=Vref" is established. In contrast, the linear driver 32 operates to raise the gate voltage BGH and lower the gate voltage BGL when "Vfb<Vref" is established.

The linear driver 31 can raise the gate voltage AGH by supplying a positive charge to the gate of the power transistor 11, and lower the gate voltage AGH by extracting the gate charge of the power transistor 11 and allowing the charge to flow toward the node NDA. Furthermore, the linear driver 31 can raise the gate voltage AGL by supplying a positive charge to the gate of the power transistor 12, and lower the gate voltage AGL by extracting the gate charge of the power transistor 12 and allowing the charge to flow toward the ground.

Similarly, the linear driver 32 can raise the gate voltage BGH by supplying a positive charge to the gate of the power transistor 13, and lower the gate voltage BGH by extracting the gate charge of the power transistor 13 and allowing the charge to flow toward the node NDB. In addition, the linear driver 32 can raise the gate voltage BGL by supplying a positive charge to the gate of the power transistor 14, and lower the gate voltage BGL by extracting the gate charge of the power transistor 14 and allowing the charge to flow toward the ground.

Figure 13:
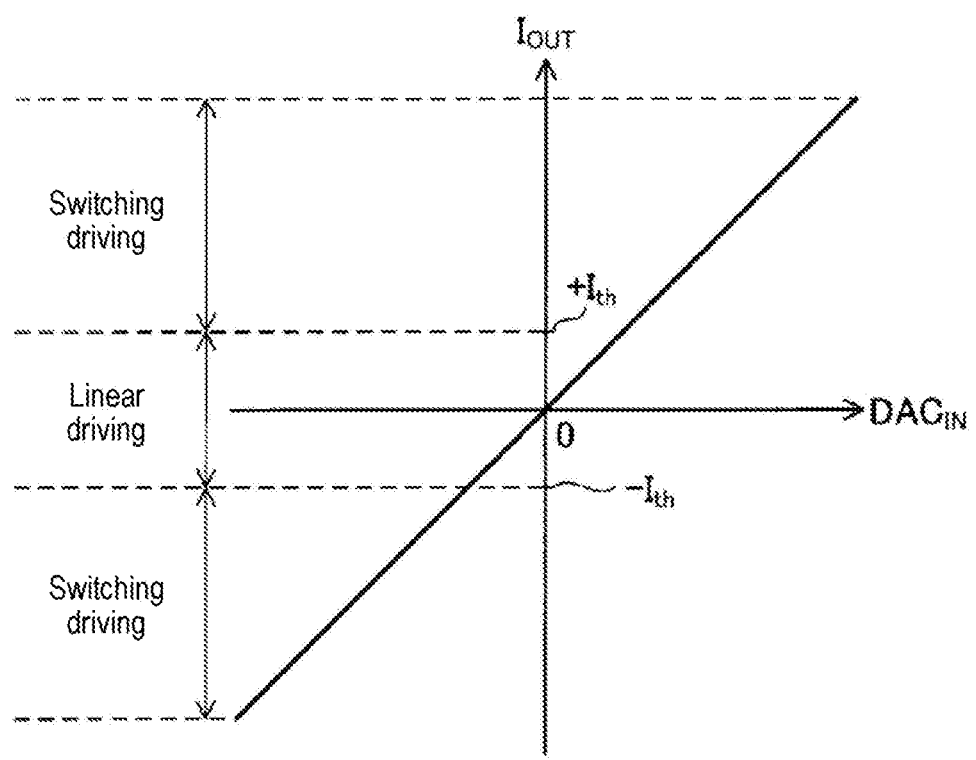
FIG. 13 is a diagram illustrating a relationship between a motor current and a driving mode of a VCM according to an embodiment of the present disclosure.

FIG. 13 is a diagram illustrating a setting method of the driving mode. The control circuit 50 can set the driving mode based on the digital signal $DAC_{IN}$. Specifically, the control circuit 50 refers to the magnitude (absolute value) of the motor current $I_{OUT}$ specified by the digital signal $DAC_{IN}$ (current command signal) as a current command value, and when the current command value is larger than a predetermined current value Ith, the control circuit 50 sets the driving mode of the VCM 114 to the switching driving mode. On the other hand, when the current command value is smaller than the predetermined current value Ith, the control circuit 50 sets the driving mode of the VCM 114 to the linear driving mode. When the current command value exactly matches the predetermined current value Ith, the control circuit 50 may set the driving mode of the VCM 114 to either the switching driving mode or the linear driving mode. The current value Ith is arbitrary but is, for example, 200 milliampere (mA).

The arm 112 repeats a seek operation and a tracking operation when reading and writing desired data from and to the magnetic disk 110. The seek operation corresponds to an operation of moving the head 111 to a track that requires reading and writing. In the subsequent tracking operation, data is read and written by allowing the head 111 to follow a desired track. Since the arm 112 is required to move quickly and substantially during the seek operation, the current command value is relatively large, and highly efficient switching driving is suitable. On the other hand, since the position of the arm 112 is required to be adjusted with high accuracy during the tracking operation, the linear driving appropriate for high-accuracy position adjustment is suitable. The linear driving is inferior to the switching driving in efficiency, but in a situation where the linear driving is performed, since the current command value is small, the loss due to the reduction in efficiency is small. Thus, the VCM driver 134 achieves both high efficiency and high accuracy in position control of the arm 112 by using the switching driving method and the linear driving method in a switching manner.

However, when the driving mode of the VCM 114 is switched from the switching driving mode to the linear driving mode, there is a concern that a glitch (hereinafter, referred to as a current glitch) may occur in the motor current $I_{OUT}$ according to a switching timing.

An occurrence state of such a current glitch will be described with reference to FIG. 14. In the SPM driver 133, first and second glitch suppression techniques as described below are employed as techniques for suppressing the current glitch, but FIG. 14 illustrates a schematic waveform example of voltages and currents when the first and second glitch suppression techniques are not employed.

Figure 14:
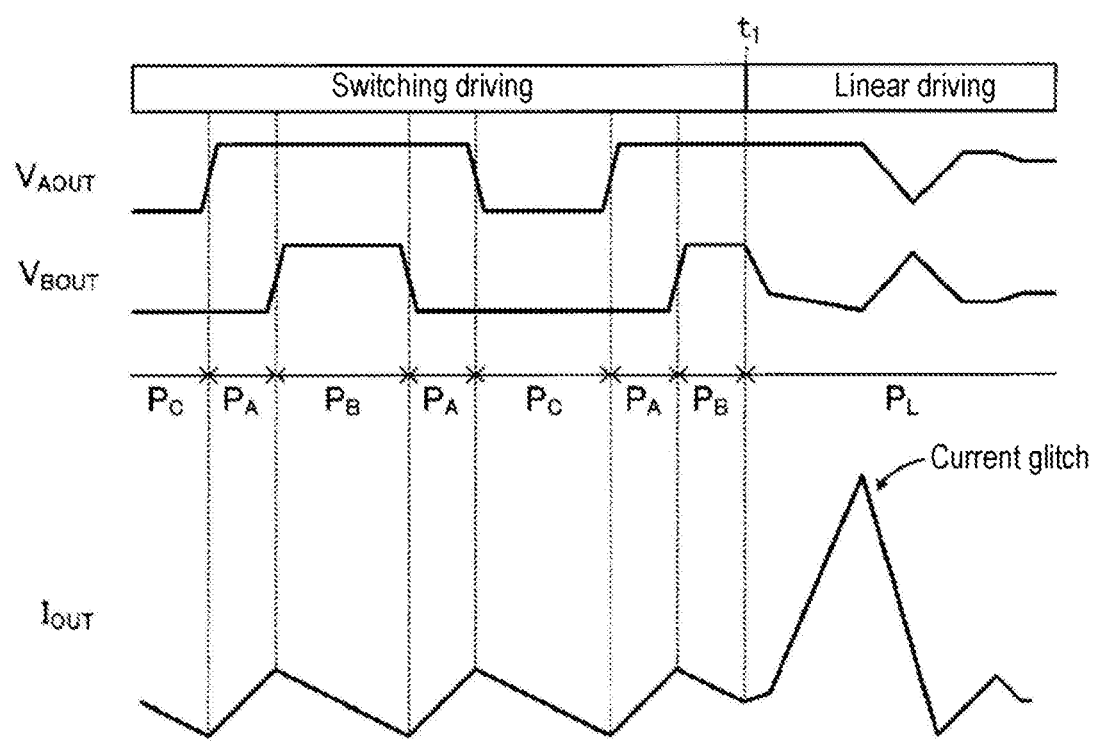
FIG. 14 is a waveform diagram of voltages and currents around a timing when switching from the switching driving mode to the linear driving mode (when first and second glitch suppression techniques are not employed).

In the example illustrated in FIG. 14, the driving mode of the VCM 114 is switched from the switching driving mode to the linear driving mode at timing ti in a situation where the positive motor current $I_{OUT}$ flows. In this case, the timing ti belongs to the section PB. Therefore, at the timing ti, the power transistors 11 to 14 are in the second ON/OFF state and the motor current path is the current path B (see FIG. 5B). At the timing ti, the switching driver 20 is switched from an active state to an inactive state, and the linear driver 30 is switched from an inactive state to an active state. Thus, the motor current path transitions from the current path B to the current path L (FIG. 6). However, since the current path B and the current path L are different, it takes a considerable amount of time to extract the gate charges that need to be extracted to perform the transition, causing an occurrence of a relatively large current glitch in a transient state of the transition. When such a current glitch occurs during the transition from the seek operation to the tracking operation, the head 111 jumps in an unexpected direction, deteriorating the data read/write performance. Furthermore, the section where the linear driving is performed is indicated by "PL."

The first glitch suppression technique will be described. In the first glitch suppression technique, when the driving mode of the VCM 114 is switched from the switching driving mode to the linear driving mode, it is monitored whether or not the motor current path has transitioned from the current path B to the current path A, and the driving mode of the VCM 114 is switched from the switching driving mode to the linear driving mode in response to detection of the transition to the current path A. The monitoring and detection are performed by the detection circuit 60 (see FIG. 7).

Figure 15:
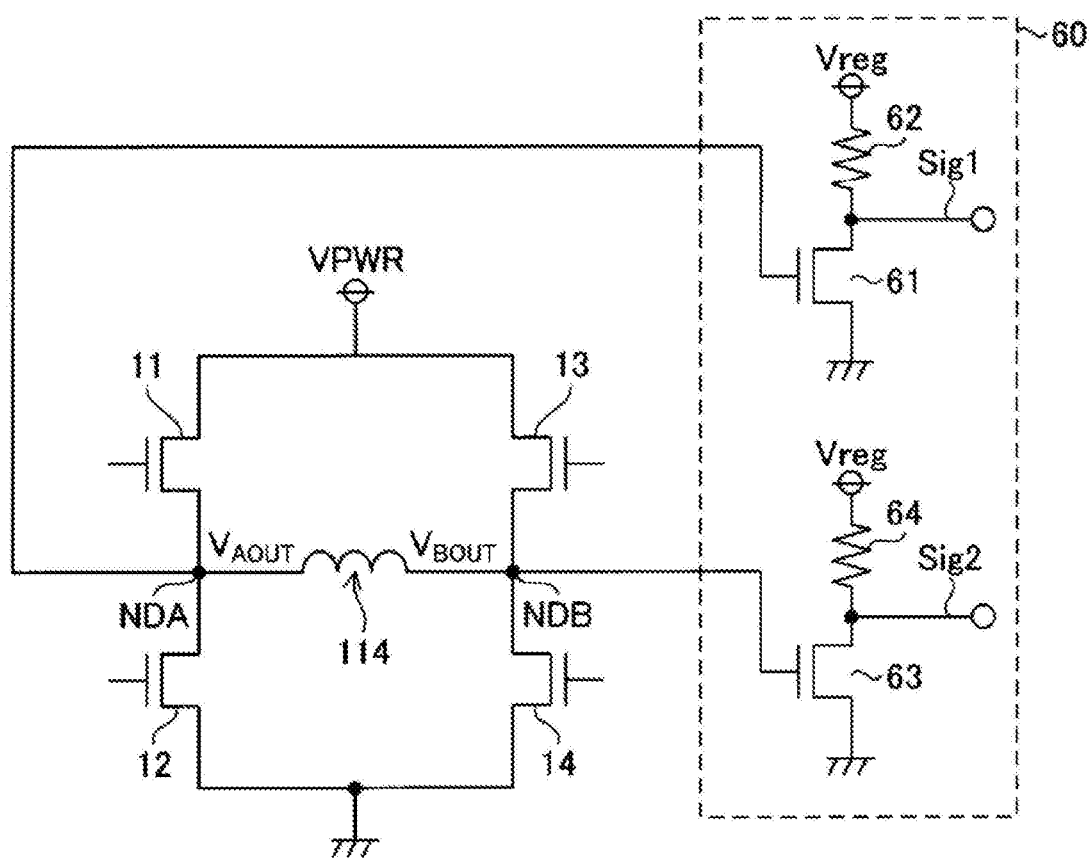
FIG. 15 is a diagram illustrating a configuration example of a detection circuit installed in the VCM driver.

FIG. 15 illustrates a configuration example of the detection circuit 60 which performs the monitoring and detection. The detection circuit 60 in FIG. 15 includes transistors 61 and 63 configured as N-channel MOSFETs and resistors 62 and 64. A gate threshold voltage of the transistor 61 may be equal to or similar to that of the power transistor 12, and a gate threshold voltage of the transistor 63 may be equal to or similar to that of the power transistor 14.

A gate of the transistor 61 is connected to the node NDA, and the voltage $V_{AOUT}$ is applied to the gate of the transistor 61. A drain of the transistor 61 is connected to a terminal to which the internal power supply voltage Vreg is applied via the resistor 62, and a source of the transistor 61 is connected to the ground. A gate of the transistor 63 is connected to the node NDB, and the voltage $V_{BOUT}$ is applied to the gate of the transistor 63. A drain of the transistor 63 is connected to a terminal to which the internal power supply voltage Vreg is applied via the resistor 64, and a source of the transistor 63 is connected to the ground. A drain voltage of the transistor 61 is output to the control circuit 50 as a signal Sig1, and a drain voltage of the transistor 63 is output to the control circuit 50 as a signal Sig2.

When the transistor 61 is turned on due to the voltage $V_{AOUT}$ being equal to or higher than the gate threshold voltage of the transistor 61, the signal Sig1 is at a low level, and when the transistor 61 is turned off due to the voltage $V_{AOUT}$ being lower than the gate threshold voltage of the transistor 61, the signal Sig1 is at a high level. When the transistor 63 is turned on due to the voltage $V_{BOUT}$ being equal to or higher than the gate threshold voltage of the transistor 63, the signal Sig2 is at a low level, and when the transistor 63 is turned off due to the voltage $VB_{OUT}$ being lower than the gate threshold voltage of the transistor 63, the signal Sig2 is at a high level.

Figure 16:
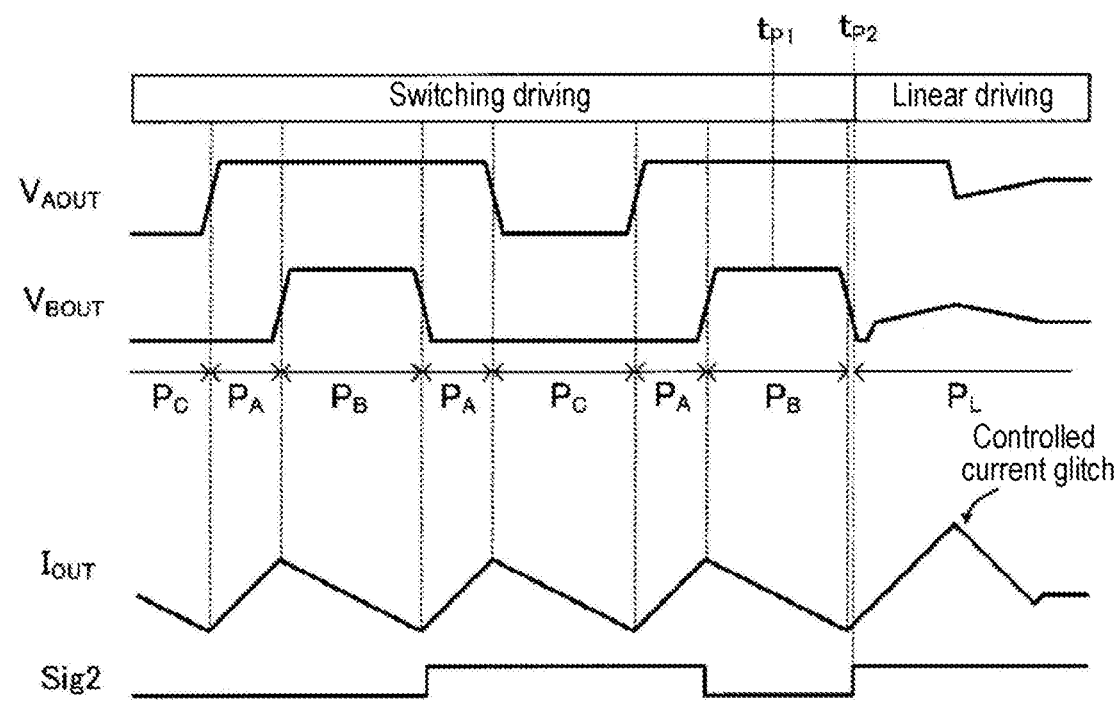
FIG. 16 is a waveform diagram of voltages and currents around the timing when switching from the switching driving mode to the linear driving mode (when the first glitch suppression technique is employed).

In the switching driving mode under the situation where the positive motor current $I_{OUT}$ flows, the high level signal Sig2 indicates that the motor current path is the current path A or C, while the low level signal Sig2 indicates that the motor current path is the current path B, and a current path next to the current path B in the motor current path is the current path A (see FIG. 16). Therefore, it can be said that the detection circuit 60 detects that the motor current path is switched from the current path B to the current path A when the signal Sig2 is switched from the low level to the high level.

Furthermore, in the switching driving mode under the situation where the positive motor current $I_{OUT}$ flows, it can be said that the high level signal Sig2 indicates that the power transistors 11 to 14 are in the first or third ON/OFF state and that the low level signal Sig2 indicates that the power transistors 11 to 14 are in the second ON/OFF state, and the ON/OFF state that comes next to the second ON/OFF state is the first ON/OFF state. Therefore, it may be considered that the detection circuit 60 detects that the states of the power transistors 11 to 14 are switched from the second ON/OFF state to the first ON/OFF state when the signal Sig2 is switched from the low level to the high level.

In the situation where the negative motor current $I_{OUT}$ flows, the signal Sig1 has a function similar to that of the signal Sig2 in the situation where the positive motor current $I_{OUT}$ flows.

FIG. 16 illustrates a schematic waveform example of voltages and currents when only the first glitch suppression technique is employed from the first and second glitch suppression techniques. In the example illustrated in FIG. 16, it is assumed that the driving mode of the VCM 114 is set to the switching driving mode before timing $t_{P1}$ in the situation where the positive motor current $I_{OUT}$ flows, and that the necessity of switching the driving mode of the VCM 114 based on the digital signal $DAC_{IN}$ at the timing $t_{P1}$ from the switching driving mode to the linear driving mode is recognized. That is, it is assumed that the magnitude (absolute value) of the motor current $I_{OUT}$ specified by the digital signal $DAC_{IN}$ (current command signal) is referred to as the current command value, and that a state in which the current command value is larger than the predetermined current value Ith with the timing $t_{P1}$ as a boundary is switched to a state in which it is smaller than the predetermined current value Ith. It is also assumed that the timing $t_{P1}$ belongs to the section PB.

In this case, the control circuit 50 does not immediately switch to the linear driving mode at the timing $t_{P1}$, but waits for switching to the linear driving mode (thus maintains the switching driving mode) until the transition of the motor current path from the current path B to the current path A (in other words, the transition of the states of the power transistors 11 to 14 from the second ON/OFF state to the first ON/OFF state) is detected, and switches the driving mode of the VCM 114 from the switching driving mode to the linear driving mode in response to the detection of the transition. Timing $t_{P2}$ in FIG. 16, which is a timing when the signal Sig2 is switched from the low level to the high level, is a timing of detecting the transition. Therefore, the control circuit 50 switches the driving mode of the VCM 114 from the switching driving mode to the linear driving mode at the timing $t_{P2}$.

In the example of FIG. 14 involving switching from the current path B to the current path L, the current glitch may be relatively large. However, when the first glitch suppression technique is employed, since the motor current path does not substantially change when switching from the switching driving mode to the linear driving mode, the current glitch is less likely to occur.

The current glitch can be suppressed by the first glitch suppression technique, but some current glitches may remain. This is partly because the gate charges supplied from the switching driver to the power transistors in the switching driving mode remain immediately after switching to the linear driving mode and these residual gate charges slow down the response of the linear driver. In the second glitch suppression technique, the residual gate charges are treated using the discharging circuit 40 (see FIG. 4).

As illustrated in FIG. 17, the control circuit 50 individually controls ON and OFF of the switches 41b to 44b by outputting the control signals CNT1 to CNT4. When the control signals CNT1, CNT2, CNT3, and CNT4 are at a high level, the switches 41b, 42b, 43b, and 44b are respectively turned on. When the control signals CNT1, CNT2, CNT3, and CNT4 are at a low level, the switches 41b, 42b, 43b, and 44b are respectively turned off. The control signals CNT1 to CNT4 are kept at a low level in principle, and a necessary control signal among the control signals CNT1 to CNT4 is set to a high level only for a short time when switching from the switching driving mode to the linear driving mode (details of which will be described below).

The discharging transistors 41a to 44a are formed so that the gate threshold voltages of the discharging transistors 41a to 44a are equal to or similar to the gate threshold voltages of the power transistors 11 to 14, respectively (however, the present disclosure is not limited thereto). Therefore, for example, in a situation where the gate voltage of the power transistor 11 is correspondingly high (for example, at a high level corresponding to the power supply voltage VCP), when the switch 41b is turned on, the gate charge of the power transistor 11 is discharged toward the node NDA through the switch 41b and the discharging transistor 41a, and the gate-source voltage of the power transistor 11 rapidly drops near the gate threshold voltage of the power transistor 11. The same applies to the power transistors 12 to 14.

FIG. 18 illustrates a schematic waveform example of voltages and currents when the first and second glitch suppression techniques are employed. In the example illustrated in FIG. 18, similar to the example illustrated in FIG. 16, it is assumed that the driving mode of the VCM 114 is set to the switching driving mode before the timing $t_{P1}$ in the situation where the positive motor current $I_{OUT}$ flows, and that the necessity of switching the driving mode of the VCM 114 from the switching driving mode to the linear driving mode is recognized based on the digital signal $DAC_{IN}$ at the timing $t_{P1}$. That is, it is assumed that the magnitude (absolute value) of the motor current $I_{OUT}$ specified by the digital signal $DAC_{IN}$ (current command signal) is referred to as the current command value, and that a state in which the current command value is larger than the predetermined current value Ith with the timing $t_{P1}$ as a boundary is switched to a state in which it is smaller than the predetermined current value Ith. It is also assumed that the timing $t_{P1}$ belongs to the section PB.

In this case, the control circuit 50 which employs the first glitch suppression technique does not immediately switch to the linear driving mode at the timing $t_{P1}$, but switches the driving mode of the VCM 114 from the switching driving mode to the linear driving mode at the timing $t_{P2}$ when the transition from the current path B of the motor current path to the current path A is detected. This point is as described above.

Furthermore, the control circuit 50 which employs the second glitch suppression technique sets the control signals CNT1 and CNT4 to a high level only for a predetermined discharge time starting from the timing $t_{P2}$, thereby turning on the transistors 41a and 44a only for the discharge time from the timing $t_{P2}$. Except for the discharge time, the control signals CNT1 and CNT4 are kept at a low level, and the control signals CNT2 and CNT3 are always at a low level in the situation where the positive motor current $I_{OUT}$ flows. An appropriate time (for example, several hundred nanoseconds to several microseconds) may be set in advance as the discharge time in consideration of the gate capacity or the like of the power transistors.

FIG. 19A is a waveform diagram of several voltages and currents around the timing $t_{P2}$ when only the first glitch suppression technique is employed from the first and second glitch suppression techniques, and FIG. 19B is a waveform diagram of several voltages and currents around the timing $t_{P2}$ when both the first and second glitch suppression techniques are employed. In comparison with FIG. 19A, in FIG. 19B, it is understood that the gate charges introduced into the power transistors during the switching driving (residual gate charges that may be unnecessary for the linear driving) are quickly discharged starting from the timing $t_{P2}$. In FIGS. 19A and 19B, attention is drawn to the gate voltage AGH of the power transistor 11, and a state in which the residual gate charge of the power transistor 11 is quickly discharged by the second glitch suppression technique is illustrated, but at this time, the residual gate charge of the power transistor 14 is similarly discharged using the discharging circuit 44.

As described above, the control circuit 50 in which the first and second glitch suppression techniques are employed performs the switching of the driving mode of the VCM 114 from the switching driving mode to the linear driving mode based on the detection of the transition from the current path B to the current path A (in other words, the transition from the second ON/OFF state to the first ON/OFF state of the power transistors 11 to 14) of the motor current path when switching the driving mode of the VCM 114 from the switching driving mode to the linear driving mode in the situation where the positive motor current $I_{OUT}$ flows. Before the timing $t_{P2}$, the switching drivers 21 and 24 supply charges to the gates of the power transistors 11 and 14 in order to set the motor current path to the current path A (i.e., in order to set the gate voltages AGH and BGL to a high level), but the supplied charges remain at the gates of the power transistors 11 and 14 at the timing $t_{P2}$. The gate voltages of the power transistors 11 and 14 due to the residual gate charges turn them on completely and are excessively high for the linear driving. Therefore, the control circuit 50 discharges the remaining gate charges using the discharging circuits 41 and 44 during the discharge time starting from the timing $t_{P2}$, and rapidly lowers the gate voltages of the power transistors 11 and 14 to near the gate threshold voltage (see FIG. 20). Thus, it is possible to perform the transition to the linear driving without loss and suppress the current glitch.

The first and second glitch suppression techniques have been described assuming the situation where the positive motor current $I_{OUT}$ flows (hereinafter, referred to as a "positive current situation"), but they may also be applied to a situation where a negative motor current $I_{OUT}$ flows (hereinafter, referred to as a "negative current situation"). In the negative current situation, the power transistors 11, 12, 13, and 14 described under the positive current situation may be replaced with the power transistors 13, 14, 11, and 12, respectively. When switching from the switching driving mode to the linear driving mode, the switches 43b and 42b may be turned on only for a predetermined discharge time in response to the transition of the signal Sig1 from the low level to the high level.

That is, the first and second glitch suppression techniques are generalized and described in consideration of both the positive current situation and the negative current situation as follows.

In the VCM driver 134 as the motor driver device, the first half-bridge circuit including the first high-side transistor and the first low-side transistor and the second half-bridge circuit including the second high-side transistor and the second low-side transistor form the full-bridge circuit for the VCM 114. Any one of the first and second half-bridge circuits is the half-bridge circuit 10A, and the other is the half-bridge circuit 10B (see FIG. 4).

In the current situation (the positive current situation or the negative current situation) where the motor current $I_{OUT}$ flows from the first half-bridge circuit toward the second half-bridge circuit via the VCM 114, the motor current path is switched among a plurality of paths by the switching driving, including a first path (current path A in the positive current situation) from the first high-side transistor to the second low-side transistor via the VCM 114, a second path (current path B in the positive current situation) from the first high-side transistor to the first high-side transistor via the VCM 114, and a third path (current path B in the positive current situation) from the first low-side transistor to the second low-side transistor via the VCM 114.

The detection circuit 60 detects a transition of the motor current path from the second path to the first path. When the driving mode of the VCM 114 is switched from the switching driving mode to the linear driving mode in the current situation (the positive current situation or the negative current situation) described above, the control circuit 50 performs the switching in response to the detection of the transition by the detection circuit 60, and at this time, it discharges the gate charge of the first high-side transistor and the gate charge of the second low-side transistor supplied to the gate of the first high-side transistor and the gate of the second low-side transistor by the switching driver 20, using the discharging circuit 40, so that the motor current path is one path.

The discharging circuit 40 includes a first high-side discharging circuit, a first low-side discharging circuit, a second high-side discharging circuit, and a second low-side discharging circuit. The first high-side discharging circuit, the first low-side discharging circuit, the second high-side discharging circuit, and the second low-side discharging circuit correspond to the discharging circuits 41, 42, 43, and 44, respectively, in the positive current situation, and correspond to the discharging circuits 43, 44, 41, and 42, respectively, in the negative current situation.

The gate charge of the first high-side transistor and the gate charge of the second low-side transistor are discharged through the first high-side discharging circuit and the second low-side discharging circuit in response to the detection of the transition by the detection circuit 60. More specifically, the gate charges of the power transistors 11 and 14 are discharged using the discharging circuits 41 and 44 in the positive current situation, and the gate charges of the power transistors 13 and 12 are discharged using the discharging circuits 43 and 42 of the power transistors 13 and 12 in the negative current situation.

Each of the first high-side discharging circuit, the first low-side discharging circuit, the second high-side discharging circuit, and the second low-side discharging circuit includes a series circuit of a switch and a rectifying element. In the configuration of FIG. 7, the diode-connected discharging transistors (41a, 42a, 43a, and 44a) function as rectifying elements, but the diodes themselves may be used as the rectifying elements. The gate charges to be discharged during switching to the linear driving mode (the gate charges of the power transistors 11 and 14 in the examples of FIGS. 18 and 20) are discharged through the corresponding rectifying elements.

The control circuit 50 receives input of predetermined information and sets the driving mode of the VCM 114 to the switching driving mode when the predetermined information indicates first information, while setting the driving mode of the VCM 114 to the linear driving mode when the predetermined information indicates second information. The example in which the current command value indicated by the digital signal $DAC_{IN}$ is used as the predetermined information is described above, and in this case, it is considered that a current command value larger than the predetermined current value Ith belongs to the first information, and a current command value smaller than the predetermined current value Ith belongs to the second information. However, the predetermined information herein is not limited to the current command value. For example, the mode command value input from the MPU 122 to the driver IC 130 separately from the current command value may be the predetermined information. In this case, for example, it may be considered that the mode command value indicating "1" corresponds to "when the predetermined information indicates the first information," and the mode command value indicating "0" corresponds to "when the predetermined information indicates the second information." For example, the MPU 122 instructs the VCM 114 to be driven by the switching driving method by outputting a mode command value of "1" to the driver IC 130 when performing the seek operation, and instructs the VCM 114 to be driven by the linear driving method by outputting a mode command value of "0" to the driver IC 130 when performing the tracking operation.

In any case, when the switching driving is performed, the control circuit 50 may wait for switching to the linear driving mode until the transition of the motor current path from the second path to the first path is detected by the detection circuit 60 (wait until the timing $t_{P2}$ in the example of FIG. 18) when the predetermined information is changed from the first information to the second information, and switch the driving mode of the VCM 114 from the switching driving mode to the linear driving mode in response to the detection of the transition.

In addition, the detection circuit 60 detects whether or not the motor current path has transitioned from the second path to the first path based on a voltage ($V_{BOUT}$ in the positive current situation or $V_{AOUT}$ in the negative current situation) at the connection node between the second high-side transistor and the second low-side transistor in the process of the motor current path transitioning from the second path to the first path.

Furthermore, in the present embodiment, it is assumed that the VCM 114 is used for the HDD device 100, but the use of the VCM 114 is arbitrary. For example, the VCM 114 may be used for lens driving of a digital camera.

In addition, the VCM 114 is a kind of DC motor which is a driving target of the motor driver device according to the present disclosure. The driving target of the motor driver device according to the present disclosure is not limited to the VCM 114, but any DC motor may be the driving target of the motor driver device according to the present disclosure.

As described above, each component of the driver IC 130 is formed in the form of a semiconductor integrated circuit, and the semiconductor device is configured by packaging the semiconductor integrated circuit in a housing (package) made of resin. However, circuits equivalent to the circuits in the driver IC 130 may be configured using a plurality of discrete components.

Furthermore, regarding any signal or voltage, the relationship between the high level and the low level may be reversed without losing the aforementioned main points.

In addition, the channel types of the FETs illustrated in the aforementioned embodiments are examples, and the configuration of the circuits including the FETs may be modified so that the N-channel type FETs are changed to the P-channel type FETs, or the P-channel type FETs are changed to the N-channel type FETs.

Moreover, each transistor illustrated in the aforementioned embodiments may be any type of transistor. For example, a transistor illustrated as a MOSFET may be replaced with a junction type FET, an IGBT (insulated gate bipolar transistor), or a bipolar transistor. Any transistor has a first electrode, a second electrode, and a control electrode. In the FET, one of the first and second electrodes is a drain, the other is a source, and the control electrode is a gate. In the IGBT, one of the first and second electrodes is a collector, the other is an emitter, and the control electrode is a gate. In the bipolar transistor which does not belong to the IGBT, one of the first and second electrodes is a collector, the other is an emitter, and the control electrode is a base.

However, the power transistors 11 to 14 described above may be voltage controlled output transistors such as FETs including MOSFETs or IGBTs (i.e., transistors in which the current flowing between the first and second electrodes is controlled depending on a voltage at the control electrode).

The embodiments of the present disclosure may be variously modified as appropriate within the scope of the technical idea described in claims. The aforementioned embodiments are merely examples of the embodiments of the present disclosure, and the meaning of the terms of the present disclosure or each component is not limited to those described in the aforementioned embodiments. The specific numerical values indicated in the aforementioned disclosure are merely examples, and may be of course changed to various numerical values.

According to the present disclosure in some embodiments, it is possible to provide a motor driver device and a semiconductor device which contribute to suppression of glitch of a motor current that may occur with switching of a driving mode of a motor.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A motor driver device for driving a motor with a full-bridge circuit, the full-bridge circuit including a first half-bridge circuit including a first high-side transistor and a first low-side transistor directly connected to each other and a second half-bridge circuit including a second high-side transistor and a second low-side transistor directly connected to each other, the motor driver device comprising:
a switching driver configured to perform switching driving in which a switching voltage is supplied from the full-bridge circuit to the motor;

a linear driver configured to perform linear driving in which a continuous linear voltage is supplied from the full-bridge circuit to the motor; and a control circuit configured to set a driving mode of the motor to a switching driving mode in which the switching driving is performed or a linear driving mode in which the linear driving is performed, wherein in a current situation where a motor current flows from the first half-bridge circuit to the second half-bridge circuit through the motor, a current path through which the motor current flows by the switching driving is switched between a plurality of paths, wherein the plurality of paths include:
 a first path including a path from the first high-side transistor to the second low-side transistor via the motor;
 a second path including a path from the first high-side transistor to the second high-side transistor via the motor; and
 a third path including a path from the first low-side transistor to the second low-side transistor via the motor, wherein the motor driver device further includes a detection circuit configured to detect a transition of the current path from the second path to the first path, and a discharging circuit configured to individually discharge gate charges of respective transistors constituting the full-bridge circuit, wherein the control circuit is configured to perform the switching, in response to a detection of the transition by the detection circuit, when switching the driving mode of the motor from the switching driving mode to the linear driving mode in the current situation, in which a gate charge of the first high-side transistor and a gate charge of the second low-side transistor supplied to a gate of the first high-side transistor and a gate of the second low-side transistor by the switching driver are discharged using the discharging circuit so that the current path is one path, wherein each of the first half-bridge circuit and the second half-bridge circuit is disposed between a predetermined power supply voltage part and a predetermined reference potential part, wherein a connection node between the first high-side transistor and the first low-side transistor is connected to a first output terminal, a connection node between the second high-side transistor and the second low-side transistor is connected to a second output terminal, and the motor is connected between the first output terminal and the second output terminal, and wherein the discharging circuit includes:
 a first high-side discharging circuit inserted between the gate of the first high-side transistor and the first output terminal;
 a first low-side discharging circuit inserted between a gate of the first low-side transistor and the reference potential part;
 a second high-side discharging circuit inserted between a gate of the second high-side transistor and the second output terminal; and
 a second low-side discharging circuit inserted between the gate of the second low-side transistor and the reference potential part.

2. The device of claim 1, wherein when switching the driving mode of the motor from the switching driving mode to the linear driving mode in the current situation, the control circuit is configured to discharge the gate charge of the first high-side transistor and the gate charge of the second low-side transistor, in response to the detection of the transition by the detection circuit, through the first high-side discharging circuit and the second low-side discharging circuit.

3. The device of claim 2, wherein each of the first high-side discharging circuit, the first low-side discharging circuit, the second high-side discharging circuit, and the second low-side discharging circuit includes a series circuit of a switch and a rectifying element, and wherein when switching the driving mode of the motor from the switching driving mode to the linear driving mode in the current situation, the control circuit is configured to turn on the switch of each of the first high-side discharging circuit and the second low-side discharging circuit only for a predetermined time, in response to the detection of the transition by the detection circuit, so that the gate charge of the first high-side transistor and the gate charge of the second low-side transistor are discharged through the corresponding rectifying element.

4. The device of claim 3, wherein in each of the first high-side discharging circuit, the first low-side discharging circuit, the second high-side discharging circuit, and the second low-side discharging circuit, the rectifying element is configured as a diode-connected discharging transistor.

5. The device of claim 1, wherein a voice coil motor configured to move a magnetic head of a magnetic disk device in a radial direction of a magnetic disk is driven as the motor.

6. A semiconductor device forming the motor driver device of claim 1,
wherein the motor driver device is formed using an integrated circuit.

7. A motor driver device for driving a motor with a full-bridge circuit, the full-bridge circuit including a first half-bridge circuit including a first high-side transistor and a first low-side transistor directly connected to each other and a second half-bridge circuit including a second high-side transistor and a second low-side transistor directly connected to each other, the motor driver device comprising:

a switching driver configured to perform switching driving in which a switching voltage is supplied from the full-bridge circuit to the motor;

a linear driver configured to perform linear driving in which a continuous linear voltage is supplied from the full-bridge circuit to the motor; and a control circuit configured to set a driving mode of the motor to a switching driving mode in which the switching driving is performed or a linear driving mode in which the linear driving is performed, wherein in a current situation where a motor current flows from the first half-bridge circuit to the second half-bridge circuit through the motor, a current path through which the motor current flows by the switching driving is switched between a plurality of paths, wherein the plurality of paths include:
 a first path including a path from the first high-side transistor to the second low-side transistor via the motor;
 a second path including a path from the first high-side transistor to the second high-side transistor via the motor; and
 a third path including a path from the first low-side transistor to the second low-side transistor via the motor, wherein the motor driver device further includes a detection circuit configured to detect a transition of the current path from the second path to the first path, and a discharging circuit configured to individually discharge gate charges of respective transistors constituting the full-bridge circuit, wherein the control circuit is configured to perform the switching, in response to a detection of the transition by the detection circuit, when switching the driving mode of the motor from the switching driving mode to the linear driving mode in the current situation, in which a gate charge of the first high-side transistor and a gate charge of the second low-side transistor supplied to a gate of the first high-side transistor and a gate of the second low-side transistor by the switching driver are discharged using the discharging circuit so that the current path is one path, wherein the control circuit is configured to receive input of predetermined information and set the driving mode of the motor to the switching driving mode when the predetermined information indicates first information or set the driving mode of the motor to the linear driving mode when the predetermined information indicates second information, and wherein when there is a change from the first information to the second information in the predetermined information when the switching driving is performed, the control circuit is configured to wait for switching to the linear driving mode until the transition is detected by the detection circuit, and switch the driving mode of the motor from the switching driving mode to the linear driving mode in response to the detection of the transition.

8. The device of claim 7, further comprising:

a feedback control signal generation circuit configured to generate a feedback control signal based on a current command signal that specifies a magnitude and a direction of the motor current and a detection signal of the motor current, wherein the switching driver is configured to supply the switching voltage based on the feedback control signal to the motor in the switching driving, wherein the linear driver is configured to supply the continuous linear voltage based on the feedback control signal to the motor in the linear driving, and wherein the control circuit is configured to receive the current command signal as the predetermined information.

9. The device of claim 8, wherein the control circuit is configured to:

set the driving mode of the motor to the switching driving mode when the magnitude of the motor current specified by the current command signal is larger than a predetermined value; and set the driving mode of the motor to the linear driving mode when the magnitude of the motor current specified by the current command signal is smaller than the predetermined value.

10. A motor driver device for driving a motor with a full-bridge circuit, the full-bridge circuit including a first half-bridge circuit including a first high-side transistor and a first low-side transistor directly connected to each other and a second half-bridge circuit including a second high-side transistor and a second low-side transistor directly connected to each other, the motor driver device comprising:

a switching driver configured to perform switching driving in which a switching voltage is supplied from the full-bridge circuit to the motor;

a linear driver configured to perform linear driving in which a continuous linear voltage is supplied from the full-bridge circuit to the motor; and a control circuit configured to set a driving mode of the motor to a switching driving mode in which the switching driving is performed or a linear driving mode in which the linear driving is performed, wherein in a current situation where a motor current flows from the first half-bridge circuit to the second half-bridge circuit through the motor, a current path through which the motor current flows by the switching driving is switched between a plurality of paths, wherein the plurality of paths include:

a first path including a path from the first high-side transistor to the second low-side transistor via the motor;

a second path including a path from the first high-side transistor to the second high-side transistor via the motor; and a third path including a path from the first low-side transistor to the second low-side transistor via the motor, wherein the motor driver device further includes a detection circuit configured to detect a transition of the current path from the second path to the first path, and a discharging circuit configured to individually discharge gate charges of respective transistors constituting the full-bridge circuit, wherein the control circuit is configured to perform the switching, in response to a detection of the transition by the detection circuit, when switching the driving mode of the motor from the switching driving mode to the linear driving mode in the current situation, in which a gate charge of the first high-side transistor and a gate charge of the second low-side transistor supplied to a gate of the first high-side transistor and a gate of the second low-side transistor by the switching driver are discharged using the discharging circuit so that the current path is one path, and wherein the detection circuit is configured to detect whether or not the transition of the current path from the second path to the first path has occurred based on a voltage at a connection node between the second high-side transistor and the second low-side transistor in a process of the transition of the current path from the second path to the first path.

* * * * *